US007489481B2

(12) United States Patent
Nagai et al.

(10) Patent No.: US 7,489,481 B2
(45) Date of Patent: Feb. 10, 2009

(54) CCP HEAD HAVING LEADS OF SUBSTANTIALLY THE SAME SIZE AND SHAPE AND NOT INTERVENING BETWEEN A SHIELD LAYER AND A MR ELEMENT

(75) Inventors: Kentaro Nagai, Atsugi (JP); Takeo Kagami, Tokyo (JP); Noriaki Kasahara, Tokyo (JP); Naoki Ohta, Tokyo (JP); Satoshi Miura, Tokyo (JP)

(73) Assignee: TDK Corporation, Tokyo (JP)

( * ) Notice: Subject to any disclaimer, the term of this patent is extended or adjusted under 35 U.S.C. 154(b) by 340 days.

(21) Appl. No.: 11/067,643

(22) Filed: Feb. 28, 2005

(65) Prior Publication Data

US 2005/0201018 A1  Sep. 15, 2005

(30) Foreign Application Priority Data

Mar. 8, 2004  (JP) .............................. 2004-063320

(51) Int. Cl.
  *G11B 5/33*  (2006.01)
  *G11B 5/127*  (2006.01)

(52) U.S. Cl. ...................................................... 360/322
(58) Field of Classification Search .......... 360/319–324
  See application file for complete search history.

(56) References Cited

U.S. PATENT DOCUMENTS

| 3,881,190 | A | * | 4/1975 | Brock et al. | ................. | 360/319 |
| 5,323,285 | A | | 6/1994 | Smith | | |
| 5,696,656 | A | * | 12/1997 | Gill et al. | ..................... | 360/319 |
| 6,396,669 | B1 | * | 5/2002 | Gill | ............................. | 360/319 |
| 6,456,465 | B1 | * | 9/2002 | Louis et al. | ................. | 360/319 |
| 6,473,277 | B1 | * | 10/2002 | Gill | ............................. | 360/319 |
| 6,525,911 | B1 | * | 2/2003 | Gill | ............................. | 360/319 |
| 6,654,209 | B2 | * | 11/2003 | Seigler et al. | ............... | 360/322 |
| 6,700,761 | B2 | * | 3/2004 | Ihara et al. | ................... | 360/327 |
| 6,731,475 | B2 | * | 5/2004 | Ikeda | ......................... | 360/322 |
| 6,757,143 | B2 | * | 6/2004 | Tunayama et al. | ....... | 360/324.1 |
| 7,061,725 | B2 | * | 6/2006 | Seigler | ....................... | 360/313 |

(Continued)

FOREIGN PATENT DOCUMENTS

JP       06-060330       3/1994

(Continued)

*Primary Examiner*—Brian E Miller
(74) *Attorney, Agent, or Firm*—Oliff & Berridge, PLC

(57) ABSTRACT

A magnetic head is provided for further improving a correlation between the dynamic characteristics and static characteristics. A lower magnetic shield layer, a magneto-resistive layer, and an upper magnetic shield layer are laminated on a base in this order. A lower lead layer and an upper lead layer apply a sense current to the magneto-resistive layer in a direction substantially perpendicular to the film plane thereof through the magnetic shield layers. The lower magnetic shield layer and upper magnetic shield layer have their shapes and sizes which substantially exactly overlap each other, when viewed in a laminating direction. The lower lead layer is electrically connected to the lower magnetic shield layer. At least a portion of the lower lead layer closer to the lower magnetic shield layer is made of a non-magnetic conductive material. The upper lead layer is electrically connected to the upper magnetic shield layer. At least a portion of the upper lead layer closer to the upper magnetic shield layer is made of a non-magnetic conductive material.

20 Claims, 32 Drawing Sheets

U.S. PATENT DOCUMENTS

| | | |
|---|---|---|
| 2002/0027751 A1 | 3/2002 | Shimazawa et al. |
| 2002/0057538 A1* | 5/2002 | Trindade et al. ............ 360/319 |
| 2002/0089795 A1* | 7/2002 | Seigler et al. ............... 360/322 |
| 2003/0011943 A1* | 1/2003 | Webb et al. .............. 360/324.1 |
| 2003/0107850 A1* | 6/2003 | Aoki et al. ............... 360/324.1 |
| 2003/0123198 A1* | 7/2003 | Sugawara et al. .......... 360/314 |
| 2003/0184922 A1 | 10/2003 | Taguchi |
| 2004/0057163 A1* | 3/2004 | Lin ............................ 360/322 |
| 2004/0071017 A1* | 4/2004 | Seigler et al. ............... 365/200 |
| 2004/0156148 A1* | 8/2004 | Chang et al. ................ 360/319 |
| 2004/0264034 A1* | 12/2004 | Watanabe et al. ........ 360/78.04 |
| 2005/0024782 A1* | 2/2005 | Cyrille et al. ............... 360/322 |

FOREIGN PATENT DOCUMENTS

| | | |
|---|---|---|
| JP | 2002-025018 | 1/2002 |
| JP | A 2003-242611 | 8/2003 |
| JP | A 2003-242613 | 8/2003 |
| JP | 2003-296907 | 10/2003 |

* cited by examiner

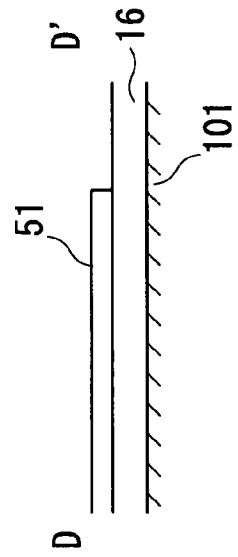
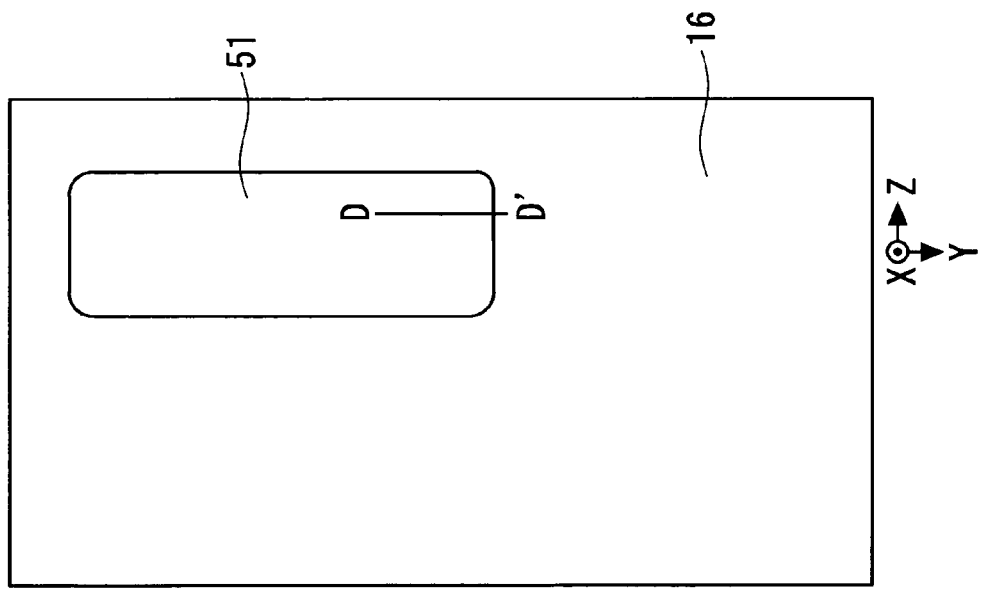

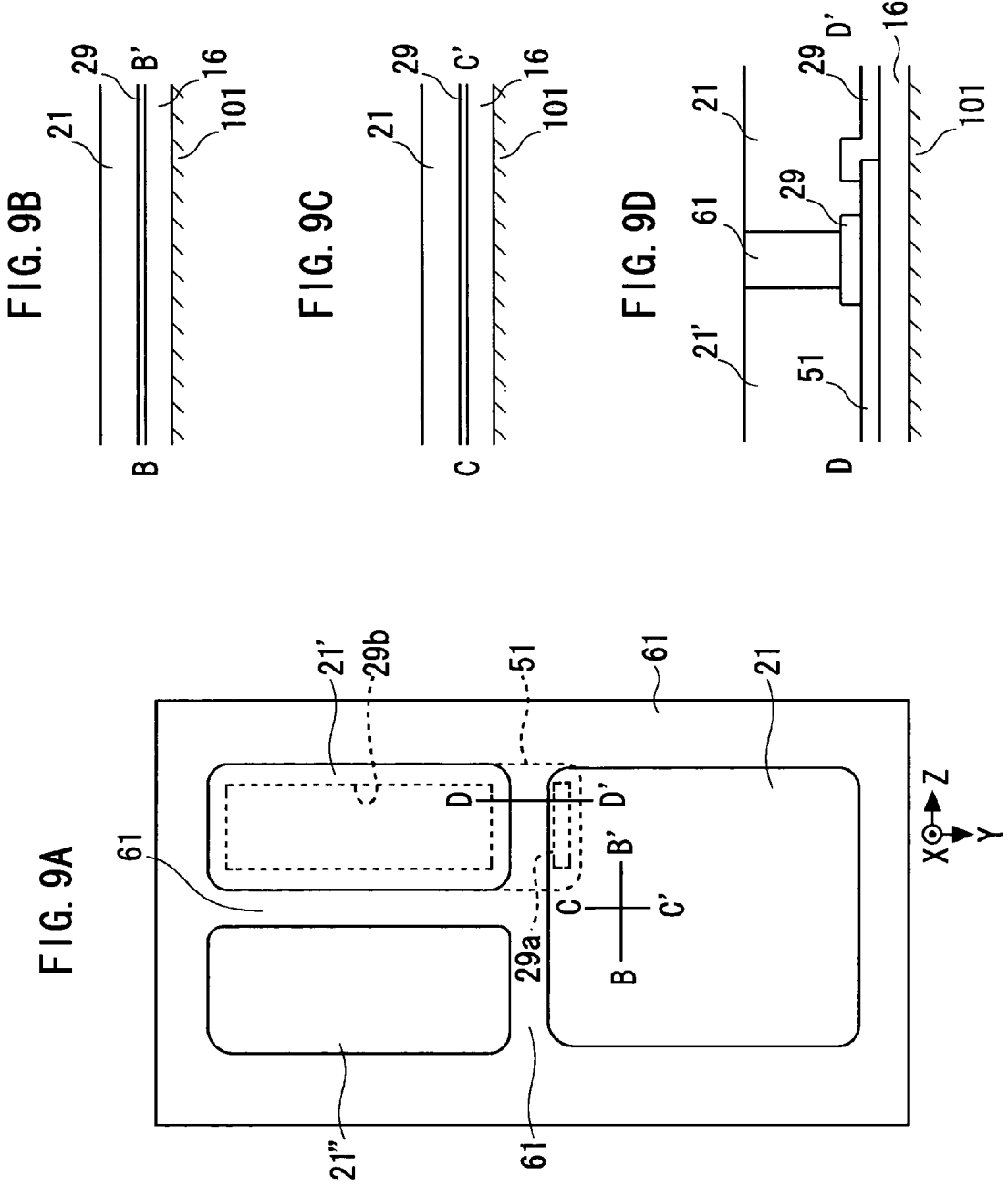

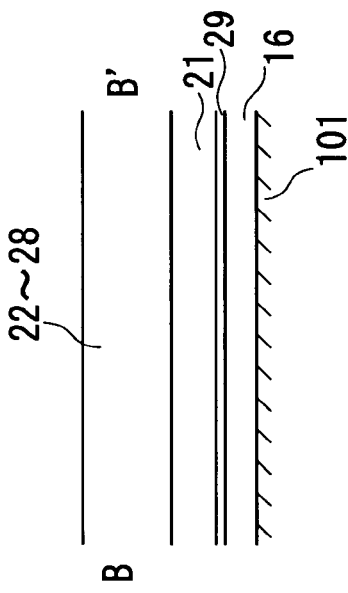
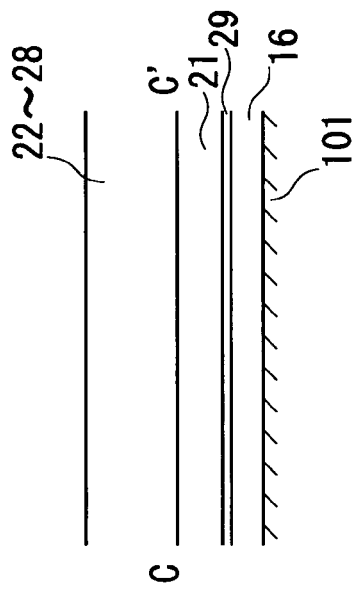
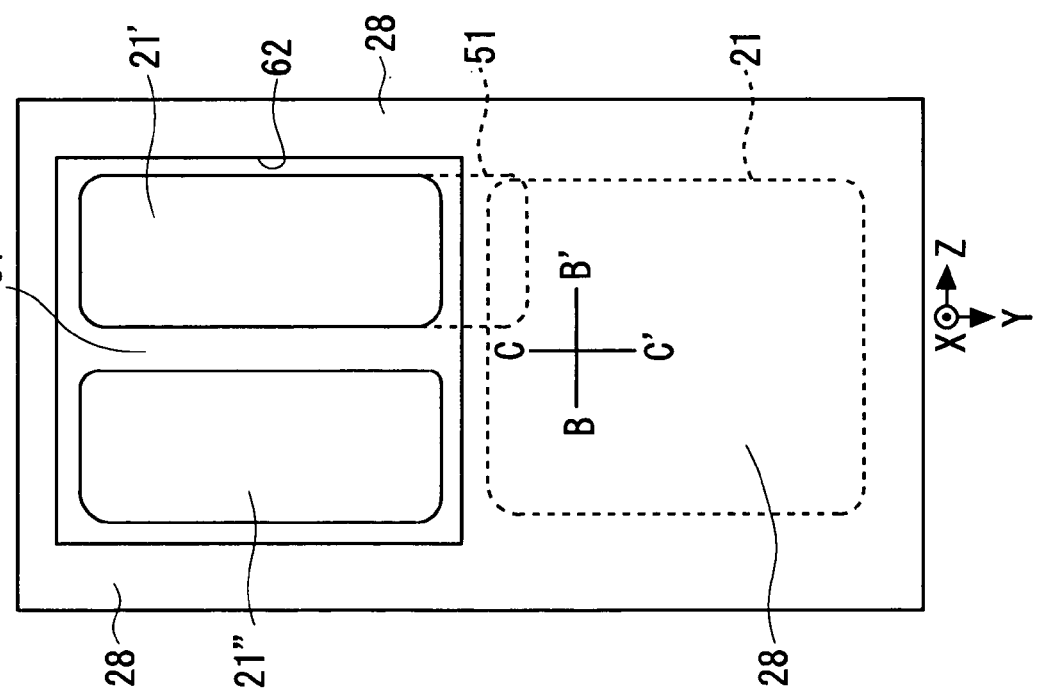

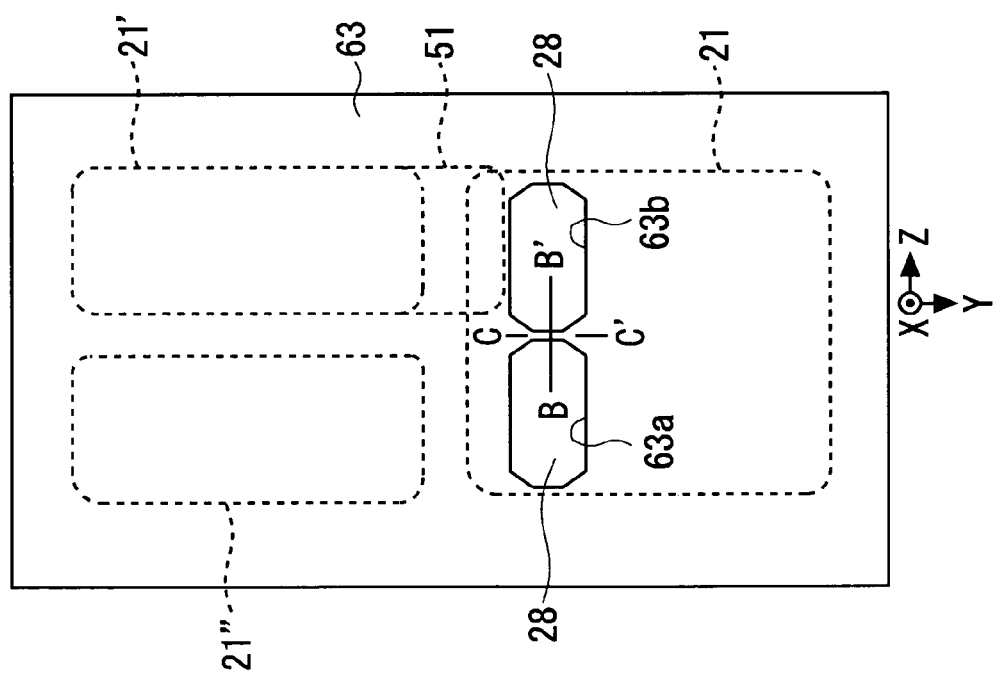
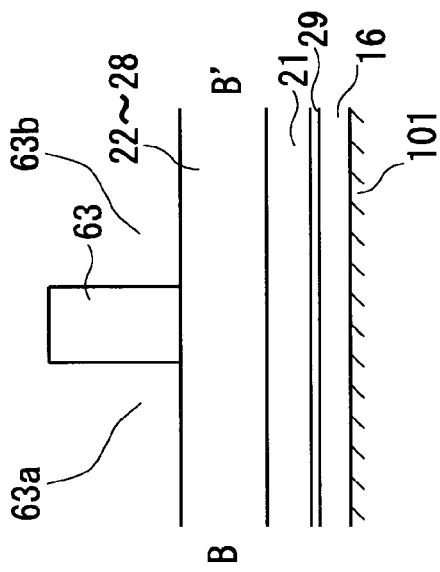
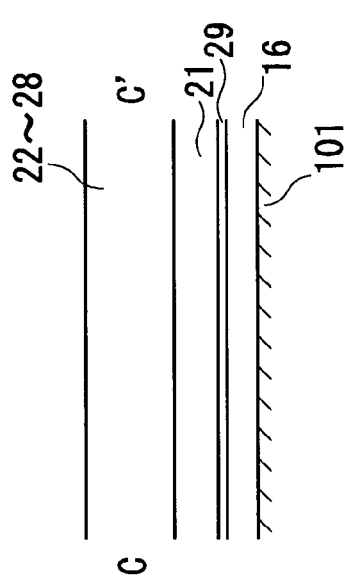

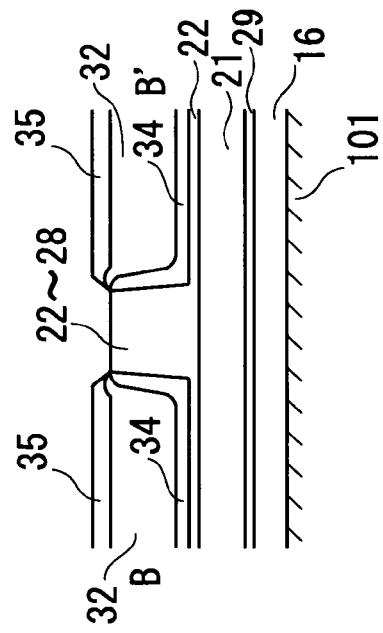
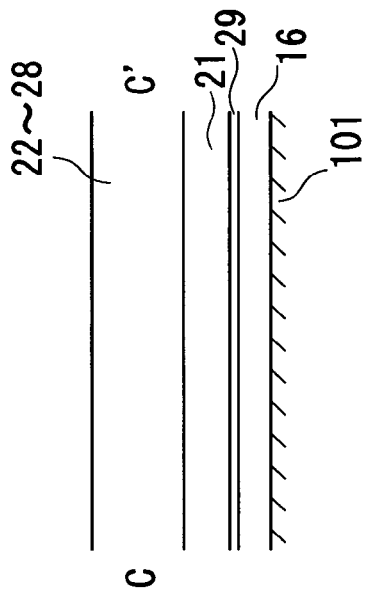
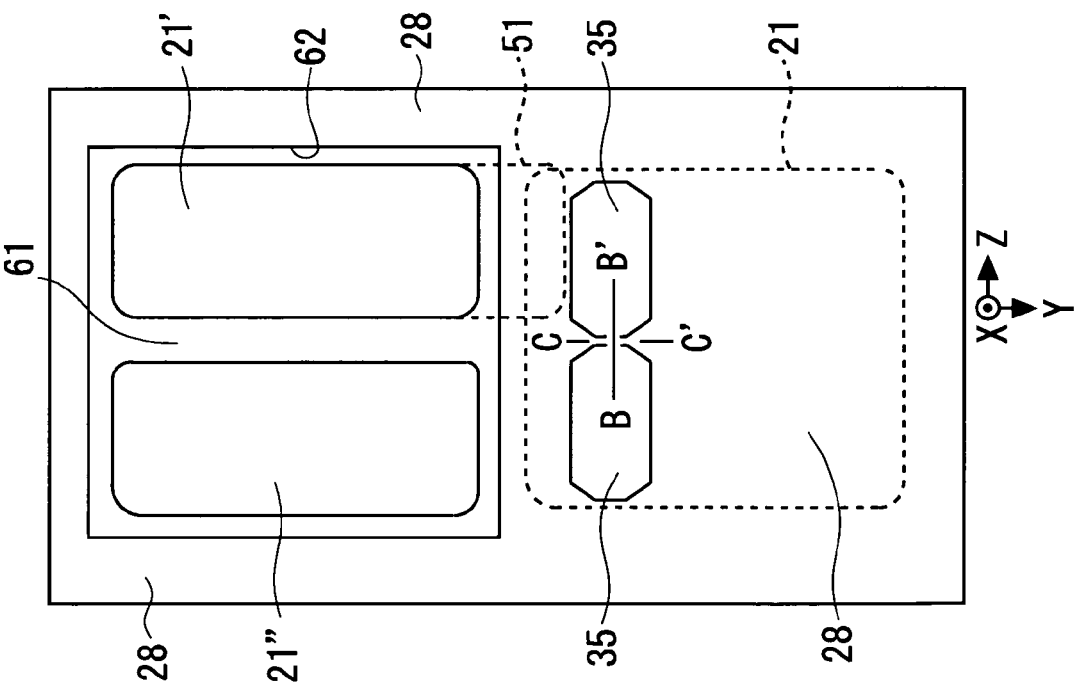

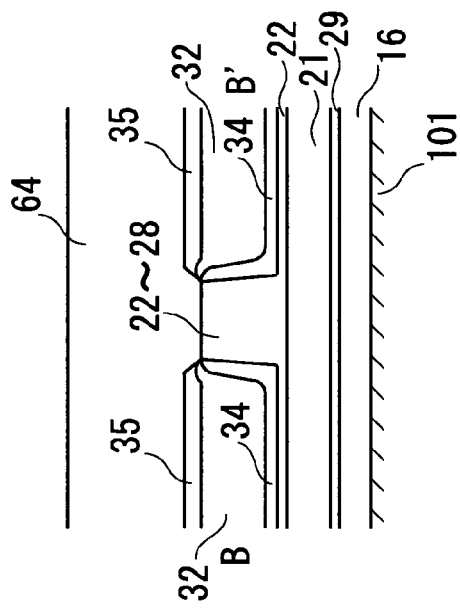
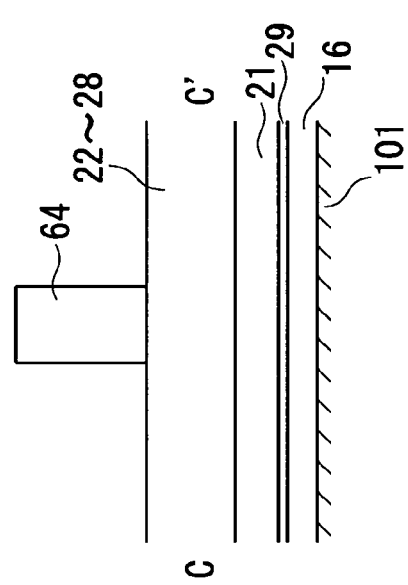
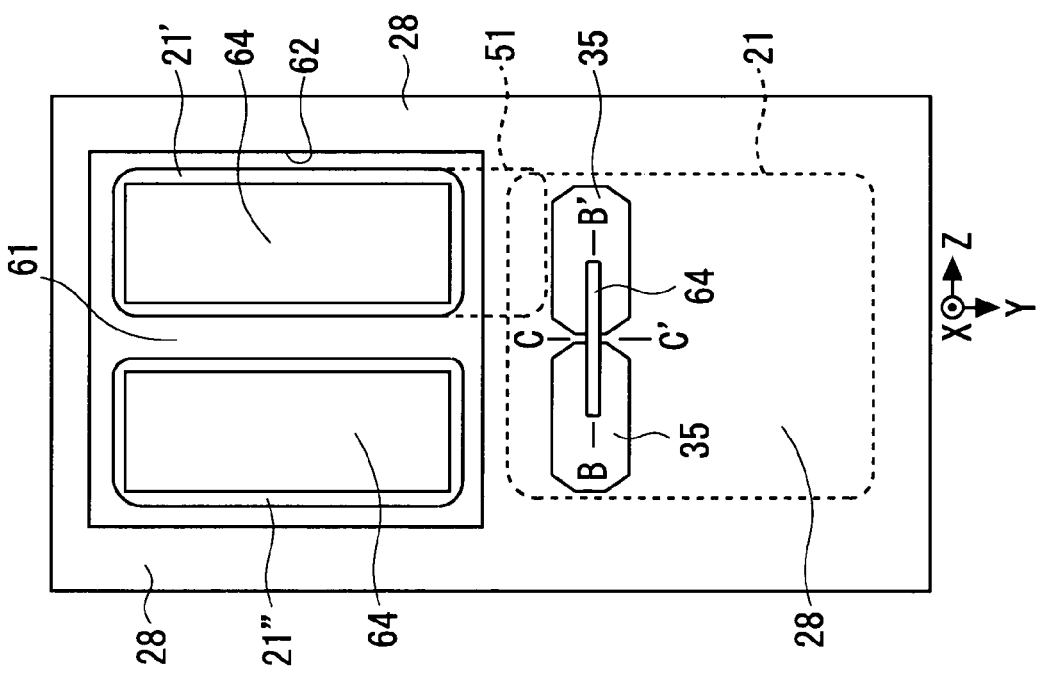

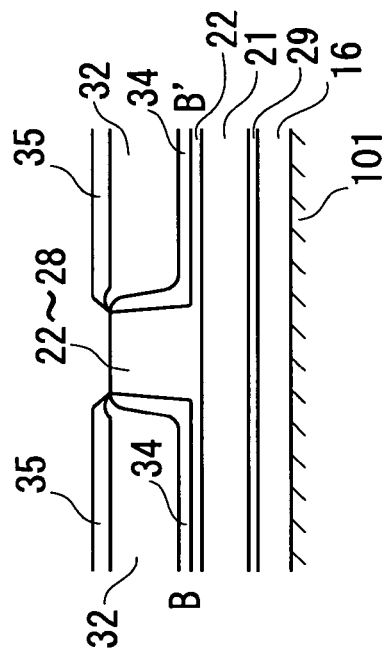
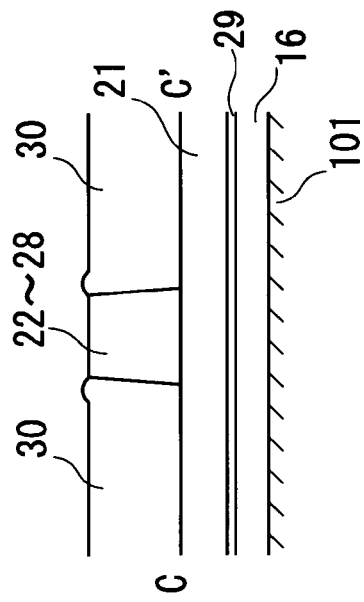
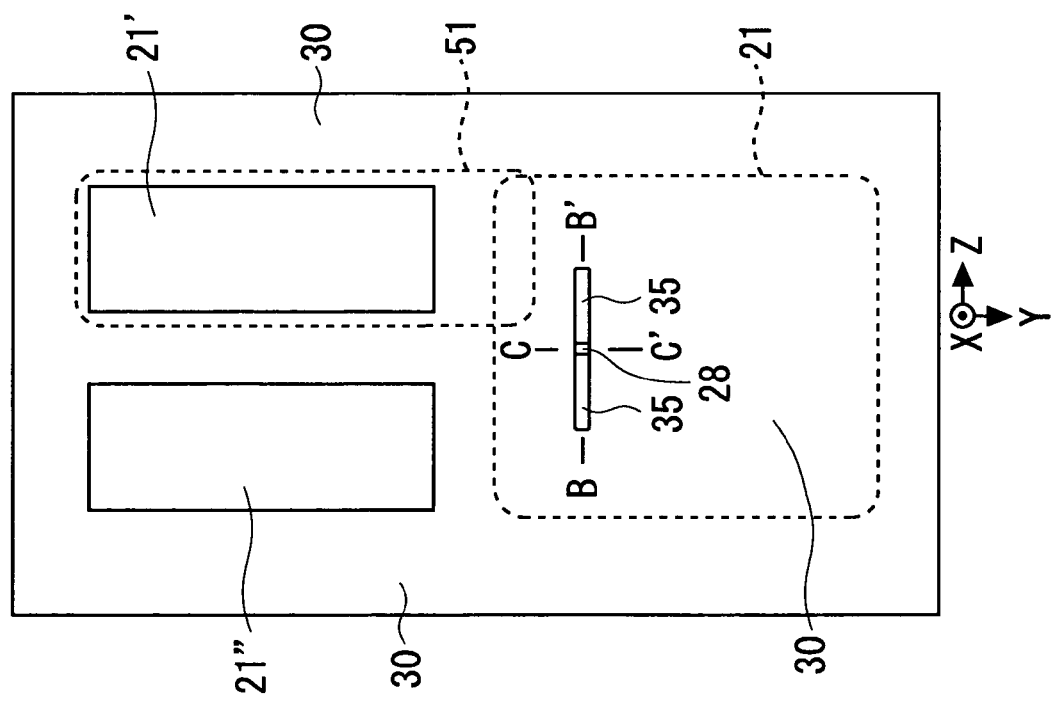

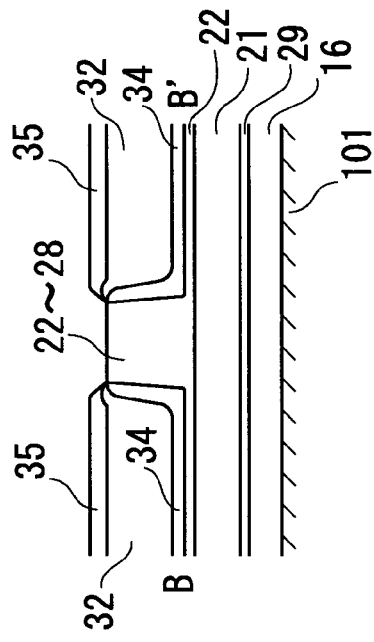
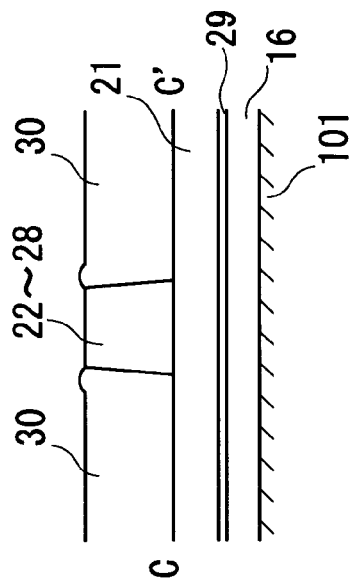
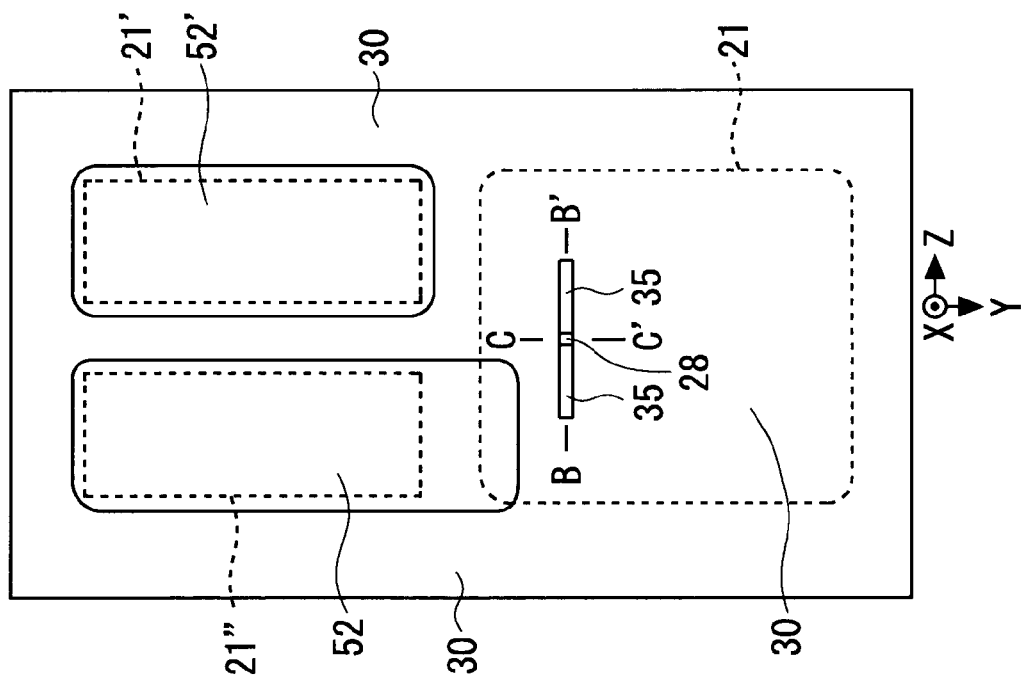

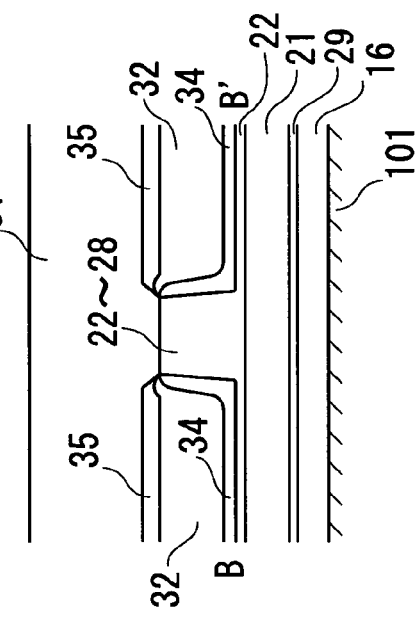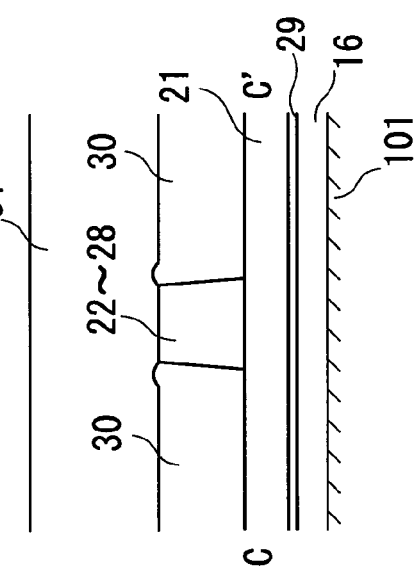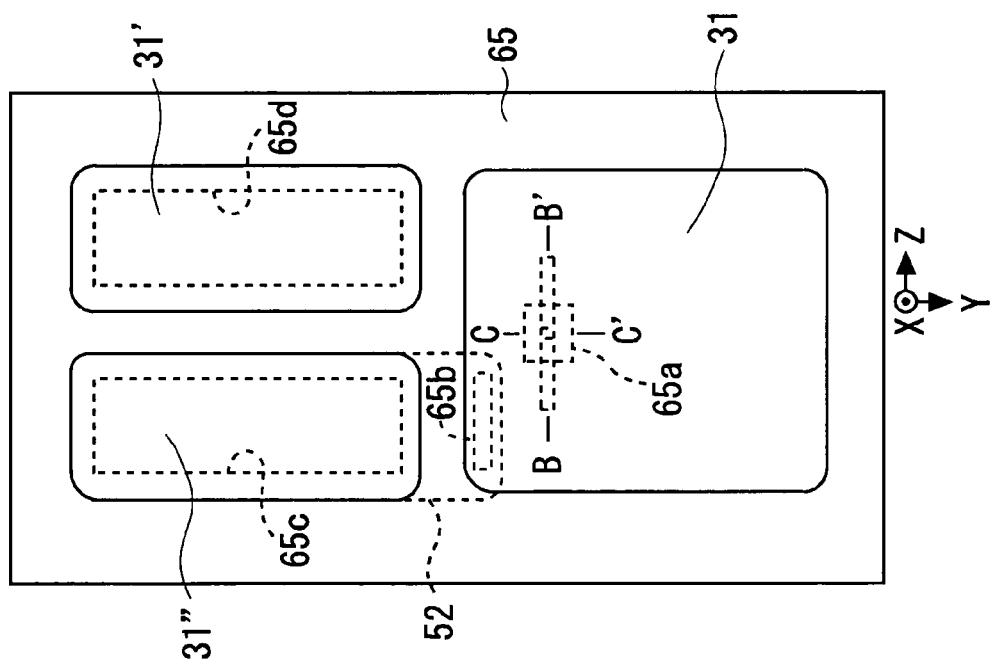

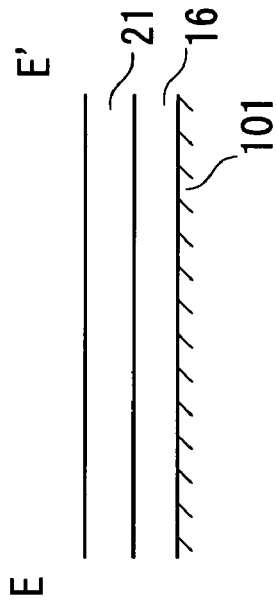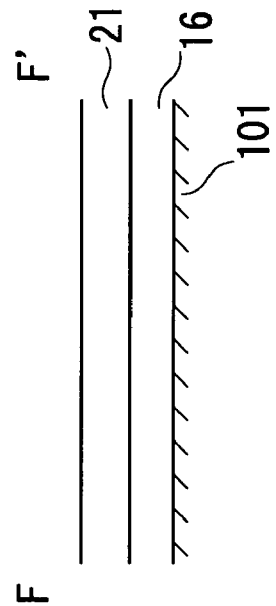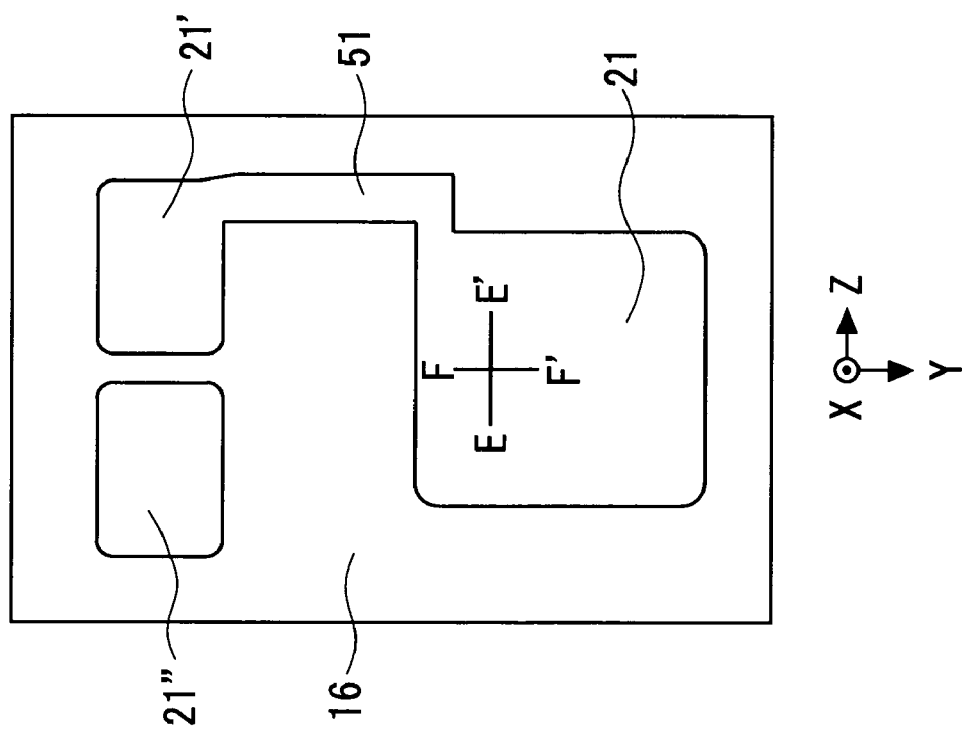
FIG. 20B (RELATED ART)
FIG. 20C (RELATED ART)
FIG. 20A (RELATED ART)

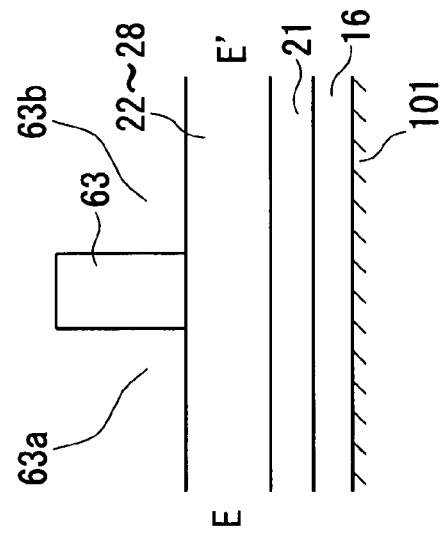
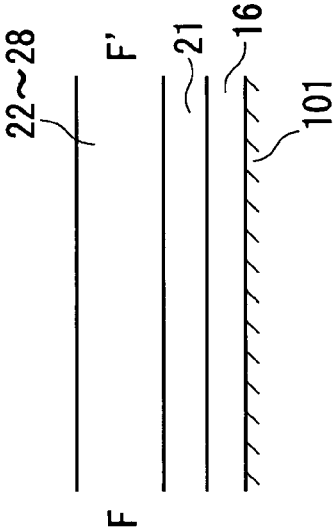
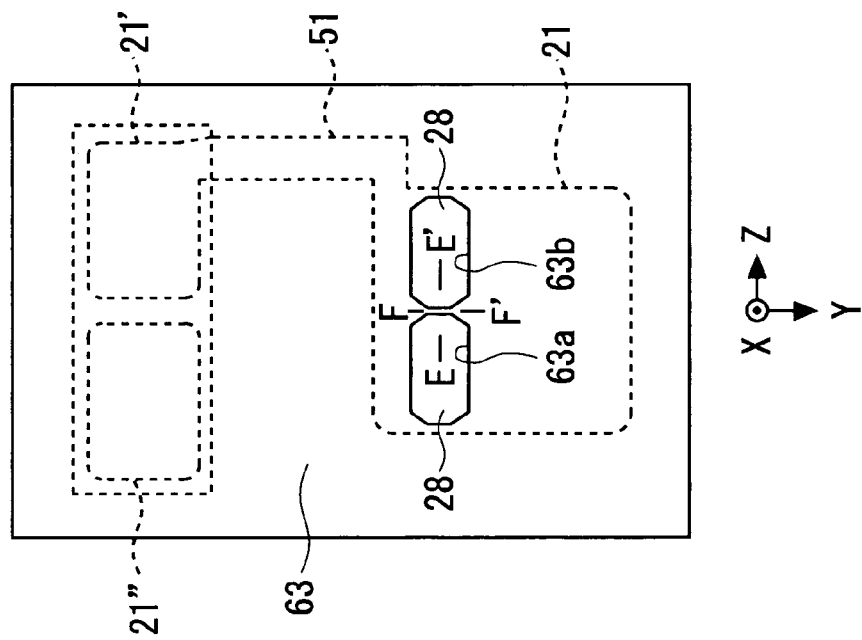
FIG. 22B (RELATED ART)
FIG. 22C (RELATED ART)
FIG. 22A (RELATED ART)

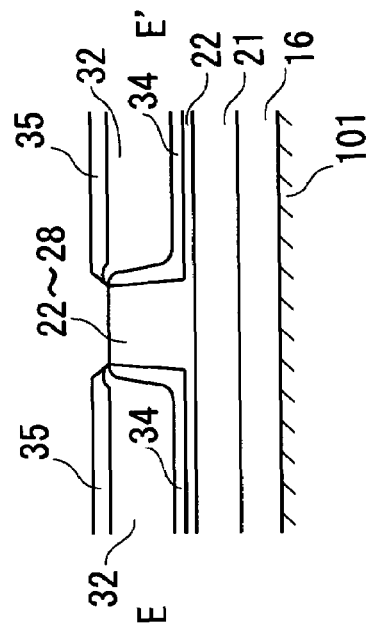
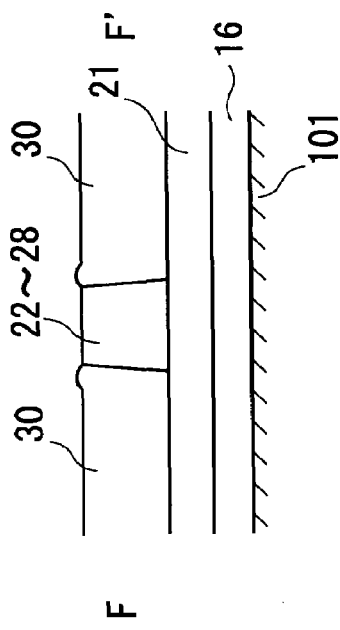
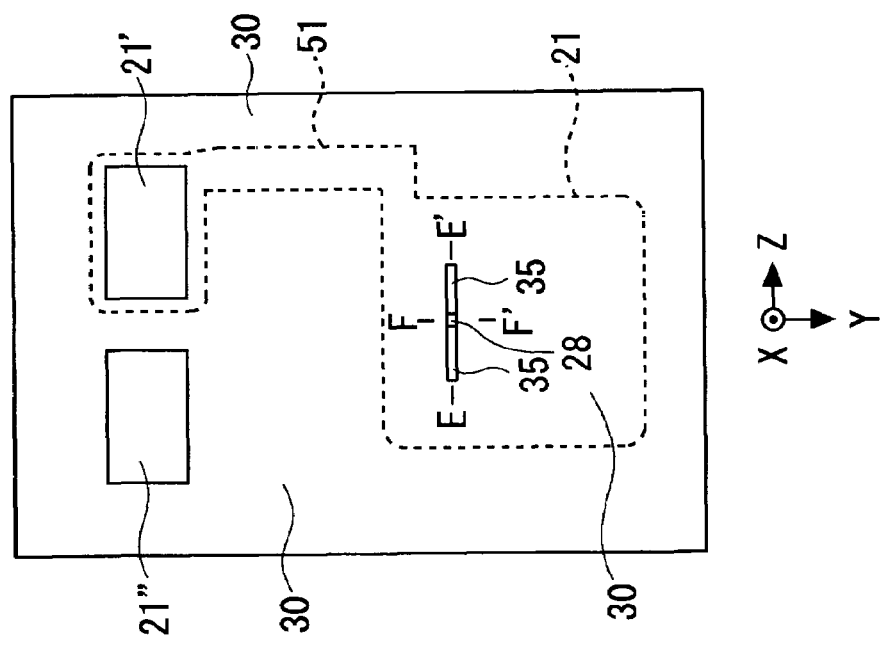

CCP HEAD HAVING LEADS OF SUBSTANTIALLY THE SAME SIZE AND SHAPE AND NOT INTERVENING BETWEEN A SHIELD LAYER AND A MR ELEMENT

BACKGROUND OF THE INVENTION

The present invention relates to a magnetic head, and a head suspension assembly and a magnetic disk apparatus which use the magnetic head.

With the trend to a larger capacity and a smaller size of hard disk drives (HDD), heads are required to have a higher sensitivity and a larger output. To meet these requirements, strenuous efforts have been made to improve the characteristics of GMR heads (Giant Magneto-Resistive Head) currently available on the market. On the other hand, intense development is under way for a tunnel magneto-resistive head (TMR head) which can be expected to have a resistance changing ratio twice or more higher than the GMR head.

Generally, the GMR head differs from the TMR head in the head structure due to a difference in a direction in which a sense current is fed. A head structure adapted to feed a sense current in parallel with a film surface, as in a general GMR head, is referred to as a CIP (Current In Plane) structure, while a head structure adapted to feed a sense current perpendicularly to a film surface, as in the TMR head, is referred to as a CPP (Current Perpendicular to Plane) structure. Since the CPP structure can use a magnetic shield itself as an electrode, it is essentially free from short-circuiting between the magnetic shield and a device (defective insulation) which is a serious problem in reducing a lead gap in the CIP structure. For this reason, the CPP structure is significantly advantageous in providing a higher recording density.

Other than the TMR head, also known as a head in CPP structure is, for example, a CPP-GMR head which has the CPP structure, though a spin valve film (including a specular type and dual spin valve type magnetic multilayer film) is used for a magneto-resistive device.

Irrespective of the CIP structure or CPP structure, in a magnetic head using a magneto-resistive device, a lower magnetic shield layer and an upper magnetic shield layer are disposed on and blow a magneto-resistive layer in order that the magneto-resistive device limitatively senses only magnetic flux from an opposite location of a magnetic recording medium and shield other magnetic flux. Then, in order to increase the resolution of the magneto-resistive device with the intention to increase the recording density, a shield gap reduction strategy has been under way to narrow down the gap between the lower magnetic shield layer and upper magnetic shield layer.

In a CIP-based magnetic head, a lower magnetic shield layer and an upper magnetic shield layer are electrically insulated from a magneto-resistive layer and a first and a second lead layer which apply a sense current to the magneto-resistive layer in parallel with the film plane in the magneto-resistive layer. In a CPP-based magnetic head, in turn, a lower magnetic shield layer and an upper magnetic shield layer are connected to a first and a second lead layer, respectively, such that the first and second lead layers apply a sense current to a magneto-resistive layer through a lower magnetic shield layer and an upper magnetic shield layer perpendicularly to the film plane in the magneto-resistive layer. In the conventional CPP-based magnetic head, the lower magnetic shield layer and first lead layer are integrally and continuously made of the same magnetic material, and the upper magnetic shield layer and second lead layer are integrally and continuously made of the same magnetic material.

For designing and manufacturing such a magnetic head, it is critical to measure its magnetic characteristics for evaluation. Generally, the evaluation of the magnetic characteristics for magnetic heads involves measuring dynamic characteristics for evaluation or measuring static characteristics for evaluation.

The evaluation of dynamic characteristics involves mounting a magnetic head slider on a suspension to actually float the magnetic head slider above a magnetic recording medium, and measuring the characteristics of the magnetic head in a situation close to an actual use environment in a magnetic disk apparatus for evaluation. On the other hand, the evaluation of static characteristics involves externally applying a magnetic head with a uniform magnetic field generated by a magnetic field generating means instead of a magnetic field from a magnetic recording medium, and measuring the characteristics of the magnetic head under the applied magnetic field for evaluation.

The static characteristic evaluation method can be readily practiced as compared with the dynamic characteristic evaluation method because of its ability to evaluate the characteristics under a different environment from an actual use environment of a magnetic disk apparatus, the ability to evaluate the characteristics without mounting a magnetic head on a suspension and without floating the magnetic head above a magnetic recording medium, and the like. Moreover, in a manufacturing process, the static characteristic evaluation method can evaluate magnetic heads at an earlier stage before the magnetic heads are independently completed. Thus, from a viewpoint of efficient sorting of products, rapid feedback to magnetic head designing, and the like, the static characteristic evaluation is used as a very convenient and effective method for evaluating the characteristics of reproducing head devices.

An important point in the static characteristic evaluation is a high correlation exhibited thereby between the static characteristic evaluation and the dynamic characteristic evaluation which is performed under an actual use environment of a magnetic disk apparatus. If the correlation is low, a part (for example, a wafer or a bar (bar-shaped magnetic head aggregate) cut from a wafer) which can form part of a magnetic head that has good dynamic characteristics is likely to be determined as defective by the static characteristic evaluation, and is therefore discarded, or on the contrary, a part which can only form part of a magnetic head that has defective dynamic characteristics is likely to be determined as good by the static characteristic evaluation and used to complete a magnetic head.

However, it is known that the shield gap reduction strategy causes a problem of a lower correlation between the dynamic characteristics and static characteristics.

JP-A-2003-242613 discloses that a correlation between dynamic characteristics and static characteristics can be increased in a magnetic head by designing the magnetic head such that a lower magnetic shield layer and a higher magnetic shield layer have their shapes and sizes which substantially exactly overlap each other when viewed in a laminating direction (for example, Type 7 in Table 1 of JP-A-2003-242613). Also, JP-A-2003-242611 discloses a magnetic head which includes a lower magnetic shield layer and an upper magnetic shield layer that have their shapes and sizes which substantially exactly overlap each other when viewed in a laminating direction (for example, Type 4 in Table 1 of JP-A-2003-242611).

The present inventors have confirmed through the experiment described later that in a CPP-based magnetic head, the correlation between the dynamic characteristics and static characteristics becomes higher in comparison with a magnetic head which has one magnetic shield layer larger than the other magnetic shield layer, when a lower magnetic shield layer and a higher magnetic shield layer have their shapes and sizes which substantially exactly overlap each other when viewed in a laminating direction in accordance with the teaching in the aforementioned JP-A-2003-242613. In this event, like the conventional CPP-based magnetic head described above, the lower magnetic shield layer and first lead layer were integrally and continuously made of the same magnetic material, and the upper magnetic shield layer and second lead layer were integrally and continuously made of the same magnetic material.

While the correlation between the dynamic characteristics and static characteristics can be made higher by applying the technique taught by the aforementioned JP-A-2003-242613 to the conventional CPP-based magnetic head in the foregoing manner, it should be understood that an ever higher correlation between the dynamic characteristics and static characteristics is desired.

SUMMARY OF THE INVENTION

It is an object of the invention to provide a CPP-based magnetic head which is capable of presenting an ever higher correlation between the dynamic characteristics and static characteristics even if the shield gap is narrowed down for a higher recording density, as well as a head suspension assembly and a magnetic disk apparatus which employ the magnetic head.

The present inventors found from the result of researches that in a CPP-based magnetic head, when a lower magnetic shield layer and an upper magnetic shield layer were designed to have their shapes and sizes which substantially exactly overlap each other when viewed in a laminating direction, and a first and a second lead layer were made of a non-magnetic conductive material, unlike the aforementioned conventional CPP-based magnetic head, the correlation between the dynamic characteristics and static characteristics could be made ever higher, and confirmed this fact through an experiment.

The reason for the foregoing result can be thought as follows. Specifically, it can be thought that when the lower magnetic shield layer and first lead layer are integrally and continuously made of the same magnetic material, and the upper magnetic shield layer and second lead layer are integrally and continuously made of the same magnetic material in a manner similar to the conventional CPP-based magnetic head, the first and second lead layers act as an antenna for leading magnetic flux to the lower magnetic shield layer and upper magnetic shield layer, respectively, thus causing a reduction in the correlation. In contrast, it can be thought that when the first and second lead layers are made of a non-magnetic conductive material, the correlation becomes higher because the first and second lead layers do not act as an antenna as mentioned above.

The present invention has been made based on the novel knowledge as described above.

A magnetic head according to a first aspect of the present invention includes a base; a first magnetic shield layer, a magneto-resistive layer, and a second magnetic shield layer laminated on the base in this order; and a first and a second lead layer for applying a sense current to the magneto-resistive layer in a direction substantially perpendicularly to the film plane in the magneto-resistive layer through the first and second magnetic shield layers. The first and second shield layers have their shapes and sizes which substantially exactly overlap each other when viewed in a laminating direction. The first lead layer is electrically connected to the first magnetic shield layer, and at least a portion of the first lead layer closer to the first magnetic shield layer is made of a non-magnetic conductive material. The second lead layer is electrically connected to the second magnetic shield layer, and at least a portion of the second lead layer closer to the second magnetic shield layer is made of a non-magnetic conductive material.

According to the first aspect, the correlation between the dynamic characteristics and static characteristics can be made ever higher even if the shield gap is narrowed down for a higher recording density in accordance with the aforementioned knowledge. Also, according to the first aspect, it has been confirmed through the experiment described later that variations are reduced in waveform asymmetry in the dynamic characteristics. It should be noted that larger waveform asymmetry inconveniently causes a lower noise margin for signal processing.

A magnetic head according to a second aspect of the present invention is arranged in a manner that, in the first aspect, the first and second magnetic shield layers have substantially the same thickness as each other.

The second aspect is preferable because the balance can be improved between the magnetic characteristics of the first magnetic shield layer and the magnetic characteristics of the second magnetic shield, centered at the magneto-resistive layer, thereby further increasing the correlation between the dynamic characteristics and static characteristics of the magnetic head.

A magnetic head according to a third aspect of the present invention is arranged in a manner that, in the first or second aspect, the first and second magnetic shield layers are made of the same material as each other.

The third aspect is preferably because the balance can be improved between the magnetic characteristics of the first magnetic shield layer and the magnetic characteristics of the second magnetic shield, centered at the magneto-resistive layer, thereby further increasing the correlation between the dynamic characteristics and static characteristics of the magnetic head.

A magnetic head according to a fourth aspect of the present invention is arranged in a manner that, in any of the first to third aspects, the magneto-resistive layer includes a tunnel barrier layer, a free layer formed on one surface side of the tunnel barrier layer, a pinned layer formed on other surface side of the tunnel barrier layer, and a pinning layer formed on one surface side of the pinned is layer opposite to the tunnel barrier layer.

A magnetic head according to a fifth aspect of the present invention is arranged in a manner that, in any of the first to third aspects, the magneto-resistive layer includes a non-magnetic metal layer, a free layer formed on one surface side of the non-magnetic metal layer, a pinned layer formed on other surface side of the non-magnetic metal layer, and a pinning layer formed on one surface side of the pinned layer opposite to the non-magnetic metal layer.

The fourth aspect is an exemplary application of the first to third aspects to a TMR head, while the fifth aspect is an exemplary application of the first to third aspects to a CPP-GMR head. Nevertheless, the first to third aspects are not limited to these examples.

A head suspension assembly according to a sixth aspect of the present invention includes a magnetic head and a suspension for supporting the magnetic head near a leading end thereof, wherein the magnetic head is the magnetic head according to any of the first to fifth aspects.

According to the sixth aspect, since the head suspension assembly employs the magnetic head according to any of the first to fifth aspects, the recording density can be increased for a magnetic disk apparatus or the like.

A magnetic disk apparatus according to a seventh aspect of the present invention includes a head suspension assembly according to the sixth aspect, an arm for supporting the head suspension assembly, and an actuator for moving the arm to position the magnetic head.

According to the seventh aspect, since the magnetic disk apparatus employs the head suspension assembly according to the sixth aspect, the recording density can be increased.

BRIEF DESCRIPTION OF THE DRAWINGS

FIGS. 7A and 7B are diagrams schematically illustrating a step which makes up a wafer process in a method of manufacturing the magnetic head illustrated in FIG. 1;

FIGS. 9A, 9B, 9C and 9D are diagrams schematically illustrating a further step which makes up the wafer process in the method of manufacturing the magnetic head illustrated in FIG. 1;

FIGS. 10A, 10B and 10C are diagrams schematically illustrating a further step which makes up the wafer process in the method of manufacturing the magnetic head illustrated in FIG. 1;

FIGS. 11A, 11B and 11C are diagrams schematically illustrating a further step which makes up the wafer process in the method of manufacturing the magnetic head illustrated in FIG. 1;

FIGS. 12A, 12B and 12C are diagrams schematically illustrating a further step which makes up the wafer process in the method of manufacturing the magnetic head illustrated in FIG. 1;

FIGS. 13A, 13B and 13C are diagrams schematically illustrating a further step which makes up the wafer process in the method of manufacturing the magnetic head illustrated in FIG. 1;

FIGS. 14A, 14B and 14C are diagrams schematically illustrating a further step which makes up the wafer process in the method of manufacturing the magnetic head illustrated in FIG. 1;

FIGS. 15A, 15B and 15C are diagrams schematically illustrating a further step which makes up the wafer process in the method of manufacturing the magnetic head illustrated in FIG. 1;

FIGS. 17A, 17B and 17C are diagrams schematically illustrating a further step which makes up the wafer process in the method of manufacturing the magnetic head illustrated in FIG. 1;

FIGS. 20A, 20B and 20C are diagrams schematically illustrating a step which makes up a wafer process in a method of manufacturing the magnetic head according to the fist comparative example;

FIGS. 22A, 22B and 22C are diagrams schematically illustrating a further step which makes up the wafer process in the method of manufacturing the magnetic head according to the fist comparative example;

FIGS. 25A, 25B and 25C are diagrams schematically illustrating a further step which makes up the wafer process in the method of manufacturing the magnetic head according to the fist comparative example;

DESCRIPTION OF THE EMBODIMENTS

In the following, a magnetic head, and a head suspension assembly and a magnetic disk apparatus according to the present invention will be described with reference to the accompanying drawings.

First, a magnetic head according to a first embodiment of the present invention will be described with reference FIGS. 1 to 5.

Figure 1:
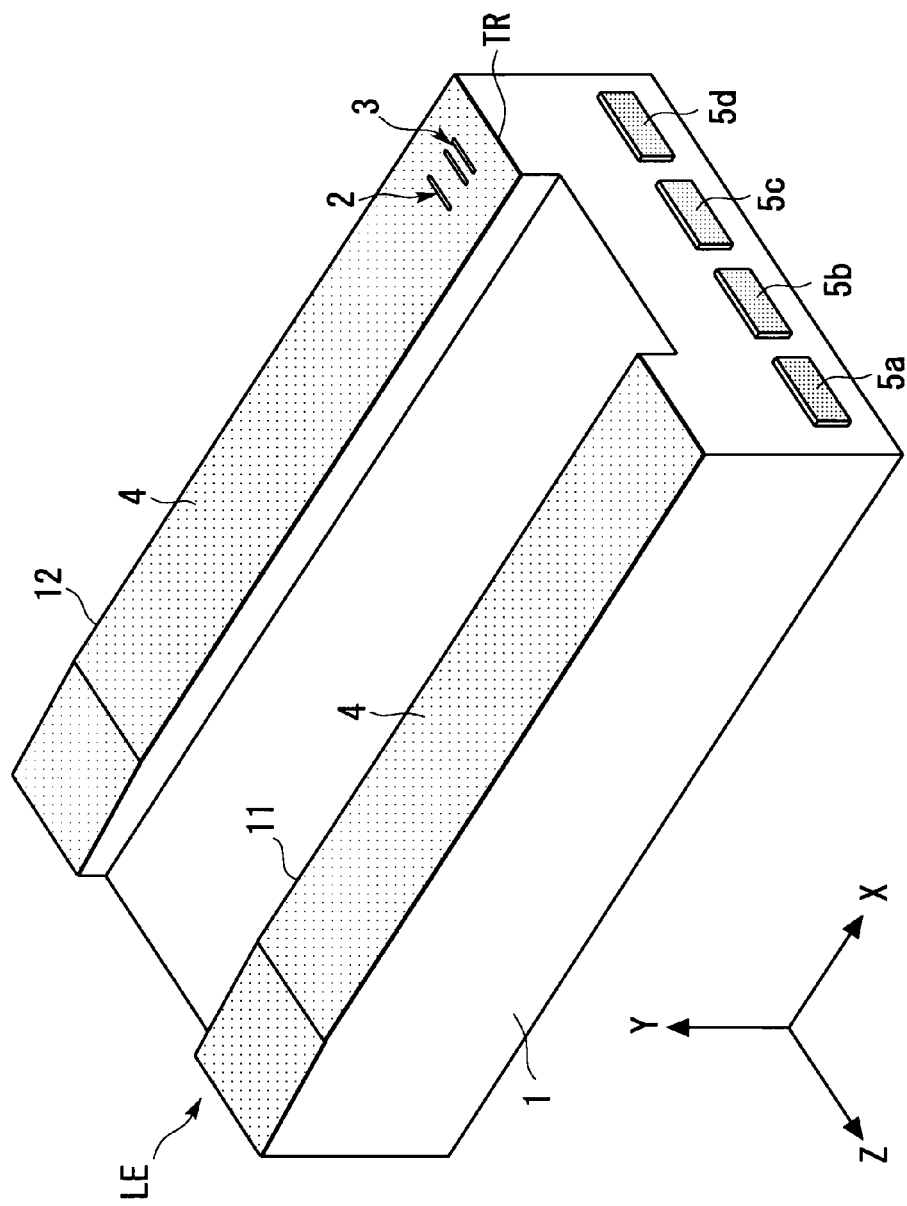
FIG. 1 is a general perspective view schematically illustrating a magnetic head according to a first embodiment of the present invention.
Figure 2:
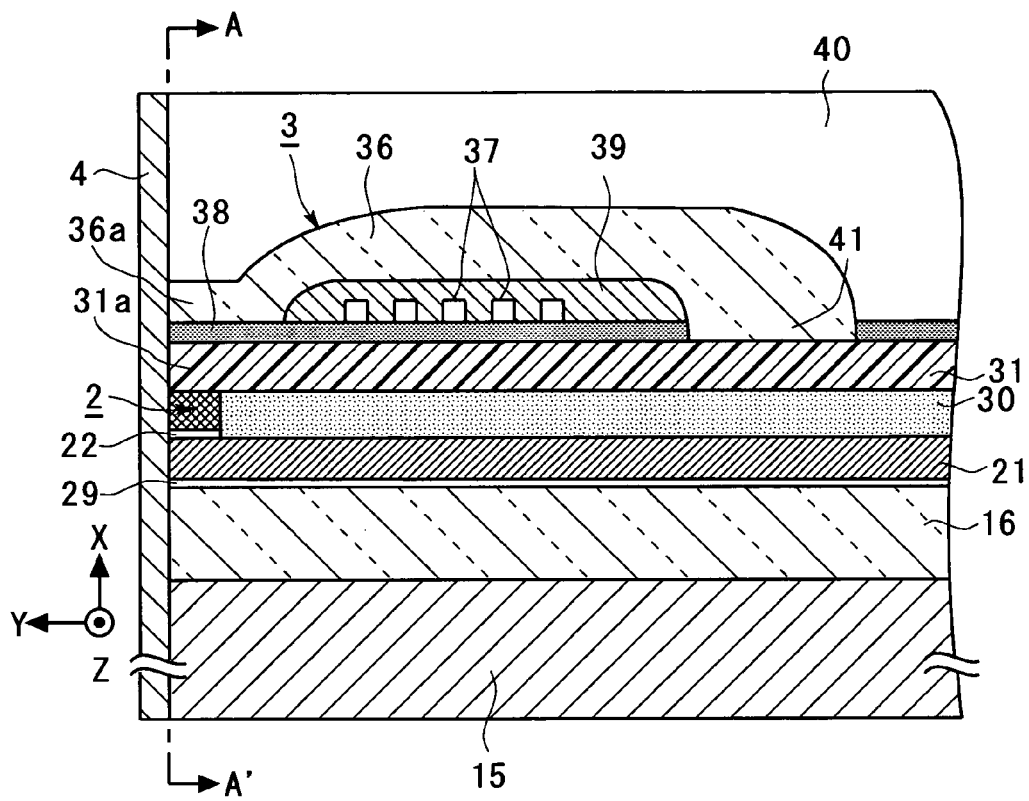
FIG. 2 is an enlarged cross-sectional view schematically illustrating a portion of a TMR device and an inductive magnetic transducing device in the magnetic head illustrated in FIG. 1.
Figure 3:
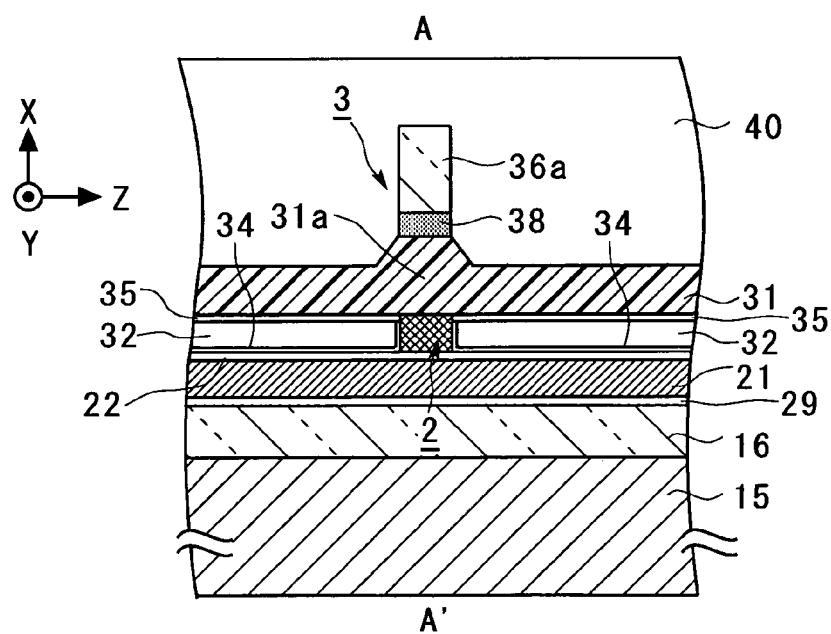
FIG. 3 is a general sectional view taken along a line A-A' indicated by arrows in FIG. 2.
Figure 4:
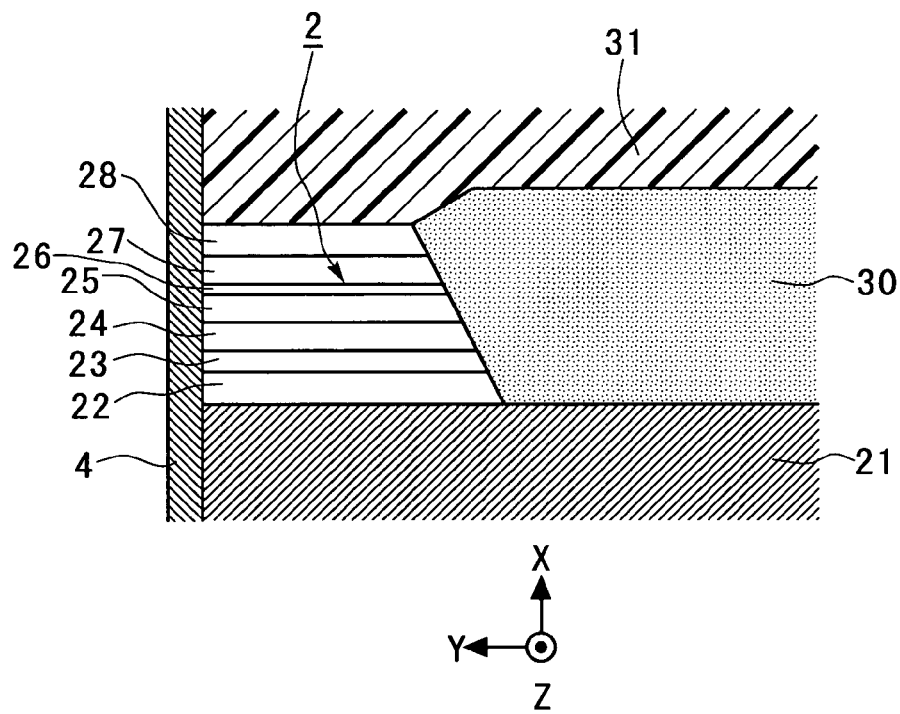
FIG. 4 is a further enlarged view around the TMR device in FIG. 2.
Figure 5:
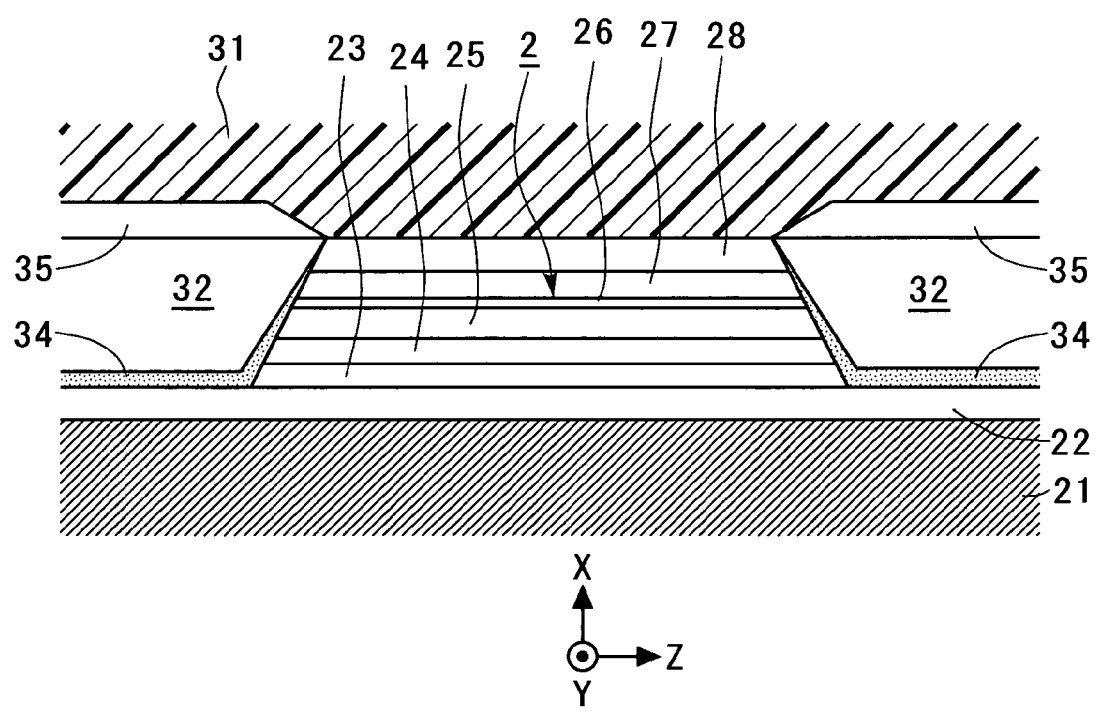
FIG. 5 is a further enlarged view around the TMR device in FIG. 3.

FIG. 1 is a general perspective view schematically illustrating the magnetic head according to the first embodiment of the present invention. FIG. 2 is an enlarged cross-sectional view schematically illustrating a portion of a TMR device 2 and an inductive magnetic transducing device 3 in the magnetic head illustrated in FIG. 1. FIG. 3 is a general sectional view taken along a line A-A' indicated by arrows in FIG. 2. FIG. 4 is a further enlarged view illustrating around the TMR device 2 in FIG. 2. FIG. 5 is a further enlarged view around the TMR device 2 in FIG. 3. For facilitating the understanding, an X-axis, a Y-axis and a Z-axis, orthogonal to one another, are defined as shown in FIGS. 1 to 5 (the same applies to figures later described). The Z-axis direction indicated by the arrow is referred to as the "+Z-direction" or "+Z-side," and the opposite direction is referred to as the "−Z-direction" or "−Z-side." The same is applied to the X-axis direction and Y-axis direction. The X-axis direction is the same as a direction in which a magnetic recording medium is moved. The Z-axis direction is the same as a track width direction of the TMR device 2.

As illustrated in FIG. 1, the magnetic head shown in FIGS. 1 to 5 comprises a slider 1 as a base; the TMR device 2 as a magneto-resistive device for use as a magnetic head device for reproduction; an inductive magnetic transducing device 3 as a magnetic head device for recording; and a protection film 4 made of a DLC film or the like, and is configured as a composite magnetic head. While the magnetic head of the first embodiment comprises one each of the devices 2, 3, the numbers of these devices are not limited in any sense.

The slider 1 has rails 11, 12 on a surface opposite to a magnetic recording medium, and the surfaces of the rails 11, 12 define air bearing surfaces (ABS). In the example illustrated in FIG. 1, there are two rails 11, 12, but the number of rails is not limited to two. For example, the slider 1 may have one to three rails, or the ABS may be a flat surface without rails. In addition, the ABS may be formed with a variety of geometric shapes for improving a floating characteristic and the like. The magnetic head according to the present invention may have any type of slider.

In the first embodiment, the protection film 4 is applied only on the surfaces of the rails 11, 12, so that the surface of the protection film 4 defines the ABS. Actually, the protection film 4 may be applied on the entire surface of the slider 1 opposite to a magnetic recording medium. While the protection film 4 is preferably provided, the protection film 4 may not be necessarily provided.

The TMR device 2 and inductive magnetic transducing device 3 are disposed on the rail 12 near an air outlet end TR, as illustrated in FIG. 1. A direction in which a recording medium is moved is identical to the X-axis direction in FIG. 1, and also identical to a direction in which air flows when the magnetic recording medium is rapidly moved. Air enters from an air inlet end LE and exits from the air outlet end TR. The slider 1 is provided on an end face of the air outlet end TR with bonding pads 5a, 5b connected to the TMR device 2, and bonding pads 5c, 5d connected to the inductive magnetic transducing device 3. The bonding pads may be arranged in an order different from the above depending on a particular design.

As illustrated in FIGS. 2 and 3, the TMR device 2 and inductive magnetic transducing device 3 are laminated through an insulating layer 29 made of $Al_2O_3$ or the like on an underlying layer 16 deposited on a ceramic base 15 which constitutes the slider 1. The ceramic base 15 is generally made of AlTiC ($Al_2O_3$—TiC), SiC or the like. When $Al_2O_3$—TiC is used, an insulating film made, for example, of $Al_2O_3$ is used for the underlying layer 16 since $Al_2O_3$—TiC is electrically conductive. The underlying layer 16 may not be provided in some cases.

As illustrated in FIGS. 4 and 5, the TMR device 2 comprises, between a lower magnetic shield layer 21 formed on the insulating layer 29 and additionally serving as a lower electrode and an upper magnetic shield layer 31 formed above the lower magnetic shield layer 21 (opposite to a base 15) and additionally serving as an upper electrode, a lower metal layer (lower layer) 22, a lower metal layer (upper layer) 23, a pinning layer 24, a pinned layer 25, a tunnel barrier layer 26, a free layer 27, and an upper metal layer (cap layer) 28 as a non-magnetic metal which serves as a protective layer, which are laminated in this order from the lower magnetic shield layer 21. The pinning layer 24, pinned layer 25, tunnel barrier layer 26, and free layer 27 constitute a magneto-resistive layer. While the actual TMR device 2 typically has a laminate structure composed of a larger number of layers, rather than the laminate structure composed of the number of layers as illustrated, the illustrated magnetic head represents a laminate structure minimally required for the basic operation of the TMR device 2 for simplifying the description.

Figure 6A:
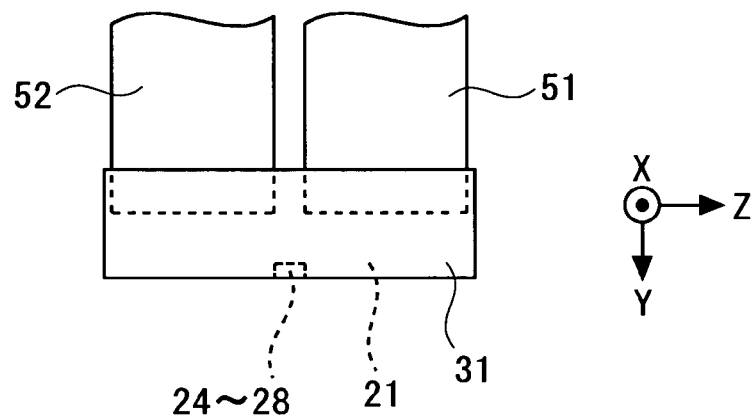
FIGS. 6A, 6B and 6C are diagrams illustrating magnetic shield layers, lead layers and the like in the magnetic head illustrated in FIG. 1.
Figure 6B:
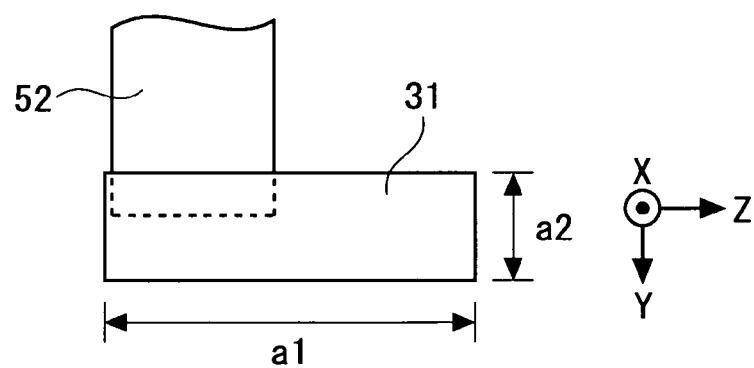
Figure 6C:
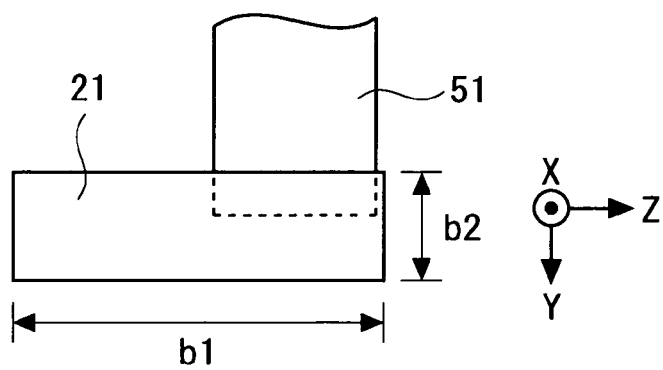

FIG. 6A is a schematic plan view generally showing a positional relationship among the lower magnetic shield layer 21, upper magnetic shield layer 31, a lower lead layer 51, upper lead layer 52, and layers 24-28 when viewed in a laminating direction (X-axis direction). FIG. 6B is a schematic plan view generally showing a positional relationship between the upper magnetic shield layer 31 and upper lead layer 52 when viewed in the laminating direction. FIG. 6C is a schematic plan view generally showing a positional relationship between the lower magnetic shield layer 21 and lower lead layer 51 when viewed in the laminating direction.

The lower lead layer 51 is electrically connected to the lower magnetic shield layer 21, but is insulated from the upper magnetic shield layer 31. The upper lead layer 52 is electrically connected to the upper magnetic shield layer 31, but is insulated from the lower magnetic shield layer 21. In this way, the lower lead layer 51 and upper lead layer 52 apply a sense current to the magneto-resistive layer in a direction substantially perpendicular to the film plane in the magneto-resistive layer through the lower magnetic shield layer 21 and upper magnetic shield layer 31. Though not shown in the figures, the lead layers 51, 52 are electrically connected to the aforementioned bonding pads 5a, 5b, respectively.

In the first embodiment, the magnetic shield layers 21, 31 are made of a magnetic material such as NiFe or the like, whereas the lead layers 51, 52 are made of a non-magnetic conductive material such as Au, Cu or the like. Each of the lead layers 51, 52 is not limited to a single layer but made be composed of a plurality of layers (for example, a Ta layer, a Cu layer, and a Ta layer laminated in this order from the lower side). The lead layers 51, 52 are only required to be magnetically separated from the lower magnetic shield layer 21 and upper magnetic shield layer 31, respectively. Therefore, at least a portion of the lower lead layer 51 closer to the lower magnetic shield layer 21 may be made of a non-magnetic conductive material. For example, all of the lower lead layer 51 may be made of a non-magnetic conductive material. Alternatively, a portion of the lower lead layer 51 closer to the lower magnetic shield layer 21 alone may be made of a non-magnetic conductive material, and the rest of the lower lead layer 51 may be made of a magnetic material. These can apply to the upper lead layer 52 as well.

Also, in the first embodiment, the lower magnetic shield layer 21 and upper magnetic shield layer 31 have their shapes and sizes which substantially exactly overlap each other when viewed in a laminating direction (X-axis direction), as illustrated in FIGS. 6A to 6C. In the first embodiment, while the magnetic shield layers 21, 22 appear to be rectangular in shape when viewed in the laminating direction, the magnetic shield layers 21, 22 are not necessarily limited to the rectangular shape.

Further, in the first embodiment, the lower magnetic shield layer 21 and upper magnetic shield layer 31 have substantially the same thickness as each other, and are made of the same material as each other. Nevertheless, the present invention is not limited to such a design.

Referring again to FIGS. 2 to 5, the lower metal layer 22 is conductive, and made, for example, of a Ta layer or the like. The lower metal layer 23 is conductive, and made, for example, of an NiFe layer or the like.

The pinning layer 24, which is comprised of an antiferromagnetic layer, is preferably formed, for example, of an Mn-based alloy such as PtMn, IrMn, or the like. The pinned layer 25 and free layer 27 are each comprised of a ferromagnetic layer formed of such a material as NiFe or the like. The pinned layer 25 has its magnetization direction fixed in a predetermined direction by an exchange bias magnetic field between the pinned layer 25 and the pinning layer 24. On the other hand, the free layer 27 freely varies its magnetization direction in response to an external magnetic field which is basically magnetic information. The pinned layer 25 and free layer 27 are not limited to single-layers, but may implemented, for example, by a laminate comprised of a combination of a pair of magnetic layers in anti-ferromagnetic coupling and a non-magnetic metal layer sandwiched therebetween. Such a laminate may be formed, for example, of three ferromagnetic layers made of CoFe/Ru/CoFe. In the first embodiment, the pinning layer 24, pinned layer 25, tunnel barrier layer 26 and free layer 27 are laminated in this order from the lower magnetic shield layer 21. Alternatively, the free layer 27, tunnel barrier layer 26, pinned layer 25 and pinning layer 24 may be laminated in this order from the lower magnetic shield layer 21. The tunnel barrier layer 26 is formed, for example, of a material such as $Al_2O_3$ or the like.

The upper metal layer 28 is formed of a single-layer film or a composite-layer film made of simple Ta, Rh, Ru, Os, W, Pd, Pt, Cu, Cr, Ni, Ti or Au, or an alloy made up of two or more of these elements in combination.

As illustrated in FIGS. 3 and 5, vertical biasing layers (magnetic domain control layers) 32 for applying a biasing magnetic field to the free layer 27 for magnetic domain control are formed on both sides of the magneto-resistive layer in the Z-axis direction. The vertical biasing layers 32 are formed, for example, of a hard magnetic material such as Cr/CoPt or the like. Alternatively, each of the vertical biasing layers 32 may be, for example, a layer using an switched connection in which a soft magnetic layer and an anti-ferromagnetic layer are laminated. Insulating layers 34, 35 are formed below and on each of vertical biasing layers 32, respectively. The insulating layer 34 also intervenes between end faces of the associated vertical biasing layer 32 and layers 23-28 on the +Z-side and −Z-side, such that the layers 23-28 are not electrically short-circuited by the vertical biasing layer 32. The insulating layer 35 may not be provided in some cases. Also, in a region where the vertical biasing layers 32, 34, 35 are not formed, an insulating layer 30 is formed between the lower metal layer 22 and the upper magnetic shield layer 31. The insulating layer 30 covers an end surface on the −Y side of the layers 23-28. The insulating layers 34, 35, 30 are made, for example, of $Al_2O_3$, $SiO_2$ or the like.

As illustrated in FIGS. 2 and 3, the inductive magnetic transducing device 3 comprises the upper electrode 31 which is additionally used as a lower magnetic layer for the device 3; an upper magnetic layer 36; a coil layer 37; a write gap layer 38 made of alumina or the like; an insulating layer 39 made of a thermosetting photoresist (for example, an organic resin such as a novolac resin); a protection layer 40 made of alumina or the like, and the like. NiFe, FeN or the like, for example, is used as a material for the upper magnetic layer 36. Leading ends of the upper magnetic shield layer 31, which is additionally used as the lower magnetic layer, and the upper magnetic layer 36 are formed as a lower pole 31a and an upper pole 36a which oppose each other through the write gap layer 38 made of alumina or the like in an infinitesimal thickness. The lower pole 31a and upper pole 36a write information on a magnetic recording medium. The upper magnetic shield layer 31, which is additionally used as the lower magnetic layer, and the upper magnetic layer 36 are coupled to each other at a joint 41 at which a yoke is opposite to the lower pole 31a and upper pole 36a so as to complete a magnetic circuit. Within the insulating layer 39, a coil layer 37 is formed such that it is spirally wound around the joint 41 of the yoke. The coil layer 37 has both ends electrically connected to the bonding pads 5c, 5d. The coil layer 37 is arbitrary in the number of turns and the number of layers. Also, the inductive magnetic transducing device 3 may be arbitrary in structure. The upper magnetic shield layer 31 may be divided into two layers across an insulating layer made of $Al_2O_3$, $SiO_2$ or the like in order to separate the role of the lower magnetic layer in the inductive magnetic transducing device 3 from the role of the upper electrode in the TMR device 2.

Next, description will be made on an exemplary method of manufacturing the magnetic head illustrated in FIGS. 1-6C.

First, a wafer process is performed. Specifically, a wafer 101 made of $Al_2O_3$—TiC, SiC or the like is provided for making a base 15. Using the thin film forming technology and the like, the aforementioned layers are formed in a large number of magnetic head forming regions in matrix on the wafer 101 to provide the aforementioned structure.

Figure 8B:
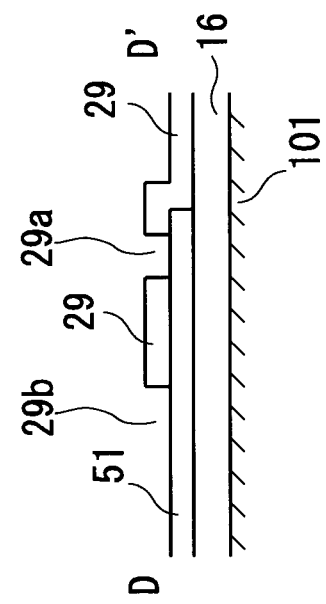
FIGS. 8A and 8B are diagrams schematically illustrating a further step which makes up the wafer process in the method of manufacturing the magnetic head illustrated in FIG. 1.

The outline of the wafer process will be described with reference to FIGS. 7 to 17. FIGS. 7 to 17 are diagrams schematically illustrating respective steps which make up the wafer process, wherein FIGS. 7A to 17A are general plan views, respectively; FIGS. 7B, 8B and 9D are general cross-sectional views taken along lines D-D' in FIGS. 7A, 8A and 9A, respectively; FIGS. 9B to 17B are general cross-sectional views taken along lines B-B' in FIGS. 7A to 17A, respectively; and FIGS. 9C to 17C are general cross-sectional views taken along lines C-C' in FIGS. 7A to 17A, respectively.

In the wafer process, an underlying layer 16 is first laminated on a wafer (substrate) 101, and the lower lead layer 51 is formed on the underlying layer 16 by a lift-off method (FIGS. 7A and 7B).

Figure 8A:
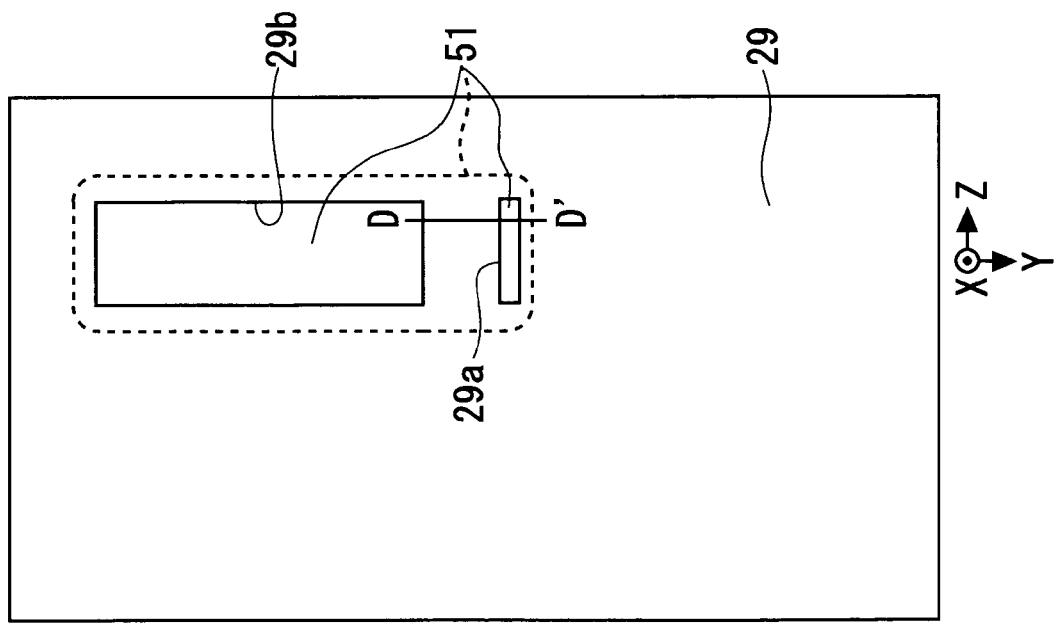

Next, an insulating layer 29 having openings 29a, 29b is formed by a lift-off method (FIGS. 8A-8C). The opening 29a is a contact hole for connecting the lower magnetic shield layer 21 to the lower lead layer 51. The opening 29b is a contact hole for a relay electrode connected to the bonding pad 5a.

Next, after the lower magnetic shield layer 21 and relay electrode formation layers 21', 21" have been formed of the same magnetic material in batch by a plating method or the like, an insulating layer 61 made of $Al_2O_3$ or the like is formed by a sputtering method or the like, and is planarized by a CMP process to expose the upper surfaces of the lower magnetic shield layer 21 and relay electrode formation layers 21', 21" (FIGS. 9A-9D).

Subsequently, the lower metal layer 22, lower metal layer 23, pinning layer 24, pinned layer 25, tunnel barrier layer 26, free layer 27, and cap layer 28 are laminated in sequence on the substrate in the foregoing state by a sputtering method or the like. Then, partial regions of these layers 22-28 are removed by ion milling or the like to form an opening 62 through the layers 22-28 for exposing the relay electrode formation layers 21', 21" (FIGS. 10A-10C). The opening 62 acts to be a through-hole for a relay electrode connected to the bonding pad 5a and a relay electrode connected to the bonding pad 5b.

Next, after a photoresist 63 has been coated on the substrate in this state, the photoresist 63 is patterned to form openings 63a, 63b, through the photoresist 63, having a spacing in the Z-axis direction in accordance with a track width of the TMR device 2 (FIGS. 11A-11C).

Subsequently, regions of the layers 23-28 which fall within the openings 63a, 63b are removed by ion milling or the like using the photoresist 63 as a mask. In the first embodiment, the lower metal layer 22 is removed up to the middle, as illustrated in FIG. 12B, but this is not a limitation. Alternatively, the lower metal layer 23, pinning layer 24, and pinned layer 25 may be removed up to a proper depth. Further alternatively, the lower shield layer 21 may be removed up to the middle. Next, before peeling off the photoresist 63, an insulating layer 34, a vertical biasing layer 32, and an insulating layer 35 are formed in sequence, and the photoresist 63 is peeled off together with the layers 34, 32, 35 which have been formed on the photoresist 63 is (FIGS. 12A-12C). With the lift-off performed as described above, the layers 34, 32, 35 are formed only in regions of the layers 23-28 which have been removed.

Next, after a photoresist 64 has been coated on the substrate in this state, the photoresist 64 is patterned into an insular shape only on a strip-shaped region which has a required width (width in the Y-axis direction) with respect to the height direction of the TMR device 2 and extends by a predetermined length in the Z-axis direction, on the area of the relay electrode formation layer 21', and on the area of the relay electrode formation layer 21" (FIGS. 13A-13C).

Subsequently, the layers 22-28 and the like in regions in which the photoresist 64 is not formed are removed by ion milling or the like using the photoresist 64 as a mask. Next, before the photoresist 64 is peeled off, an insulating layer 30 is formed, and the photoresist 64 is peeled off together with the layer 30 formed on the photoresist 64 (FIGS. 14A-14C). With the lift-off performed as described above, the layer 30 is formed only in regions which were not masked by the photoresist 64 during the milling.

Next, the upper lead layer 52 and relay electrode formation layer 52' are formed of the same non-magnetic metal material in batch by a lift-off method (FIGS. 15A-15C).

Figure 16B:
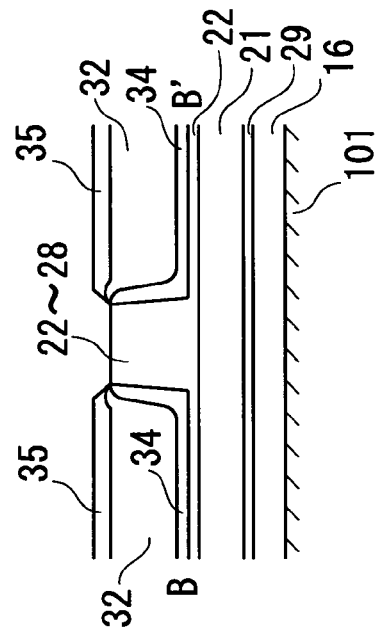
FIGS. 16A, 16B and 16C are diagrams schematically illustrating a further step which makes up the wafer process in the method of manufacturing the magnetic head illustrated in FIG. 1.
Figure 16C:
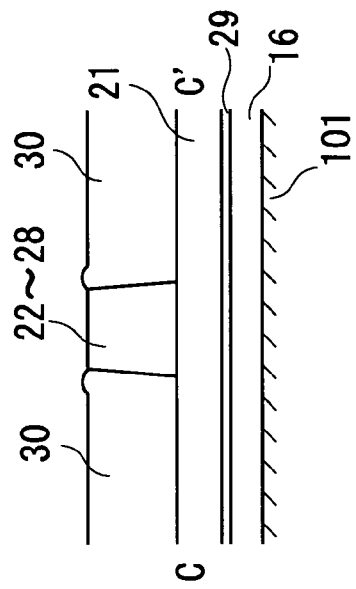
Figure 16A:
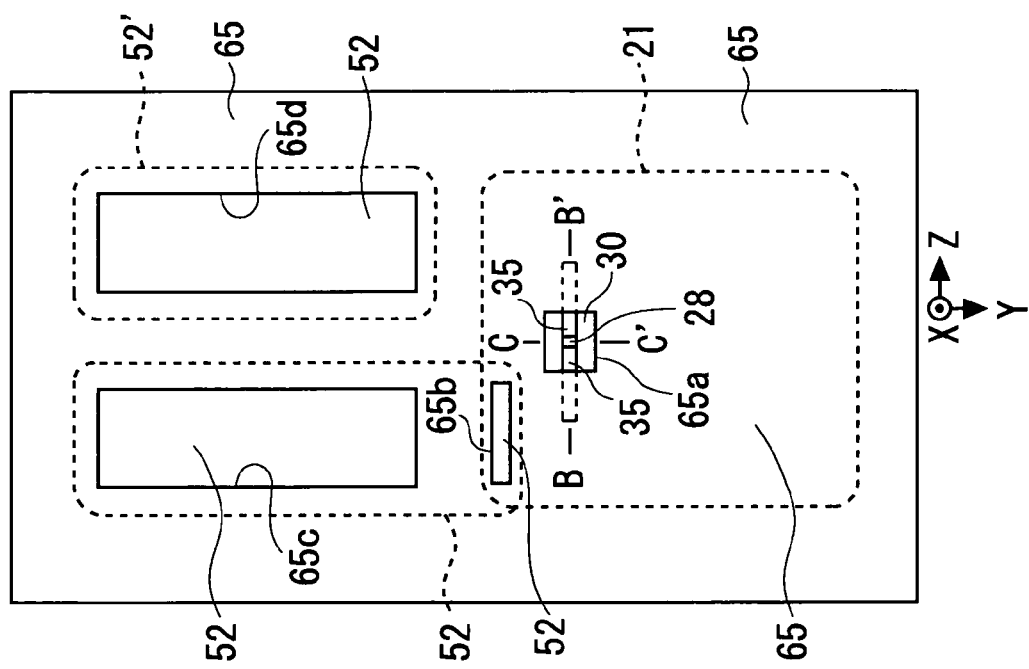

Next, an insulating layer 65 made of $Al_2O_3$ is formed by a lift-off method to have openings 65a-65d (FIGS. 16A-16C). The opening 65a is a contact hole for connecting the upper magnetic shield layer 31 to the cap layer 28. The opening 65b is a contact hole for connecting the upper magnetic shield layer 31 to the upper lead layer 52. The opening 65c is a contact hole for a relay electrode connected to the bonding pad 5b. The opening 65d is a contact hole for a relay electrode connected to the bonding pad 5a.

Subsequently, the upper magnetic shield layer 31 and relay electrode formation layers 31', 31" are formed by the same magnetic material in batch by a plating method or the like (FIGS. 17A-17C).

Finally, the gap layer 38, coil layer 37, insulating layer 39, upper magnetic layer 36, and protection layer 40 are formed, and the electrodes 5a-5d and the like are formed. By now, the wafer process is completed.

Next, magnetic heads according to the first embodiment are completed through a known process for the wafer which has undergone the wafer process. Briefly describing, each bar (bar-shaped magnetic head aggregate) having a plurality of magnetic heads arranged in a line on the base is sawed from the wafer. Next, the bar is lapped on its ABS side for setting a throat height, an MR height, and the like for the bar. The surface finally exposed by the lapping is a cross section substantially along a line B-B' in FIG. 17A. Next, a protection film 4 is formed on the surface of the ABS side, and rails 11, 12 are formed by etching or the like. Finally, the bar is cut by machining into individual magnetic heads. In this manner, the magnetic heads according to the first embodiment are completed.

In the first embodiment, the lower magnetic shield layer 21 and upper magnetic shield layer 31 have their shapes and sizes which substantially exactly overlap each other when viewed in the laminating direction (X-axis direction), and the lower lead layer 51 and upper lead layer 52 are made of a non-magnetic conductive material, as described above. Consequently, even if the shield gap is narrowed down for a higher recording density, the correlation can be further increased between the dynamic characteristics and static characteristics. This fact was confirmed through an experiment, later described. Also, according to the first embodiment, variations is reduced in waveform asymmetry in the dynamic characteristics. This fact was also confirmed through an experiment, later described.

As will be understood from the description on the manufacturing method described above, the relay electrode formation layers 21', 21", 31', 31" are made of a magnetic material, but are magnetically separated from the lower magnetic shield layer 21 and upper magnetic shield layer 31, so that the relay electrode formation layers 21', 21", 31', 31" do not act as an antenna for leading magnetic flux to the lower magnetic shield layer 21 or upper magnetic shield layer 31, thus exerting no influence to the correlation between the dynamic characteristics and static characteristics.

Now, magnetic heads according to a first and a second comparative example, which are compared with the magnetic head according to the first embodiment, will be described with reference to FIGS. 18 and 19.

Figure 18A:
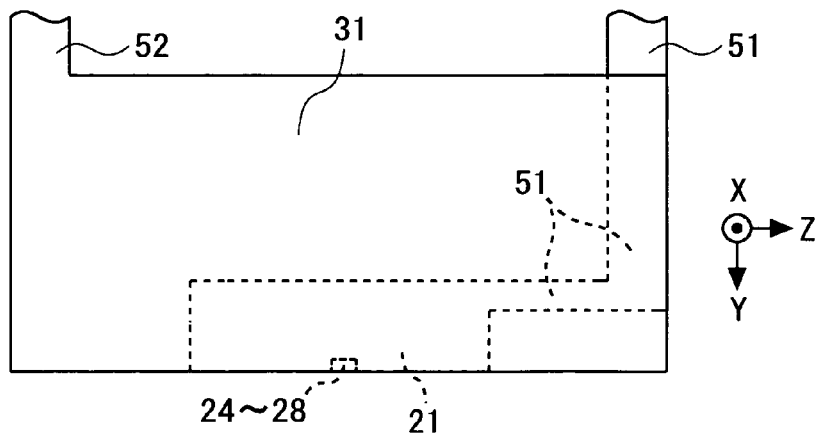
FIGS. 18A, 18B and 18C are diagrams illustrating magnetic shield layers, lead layers and the like in a magnetic head according to a fist comparative example.
Figure 18B:
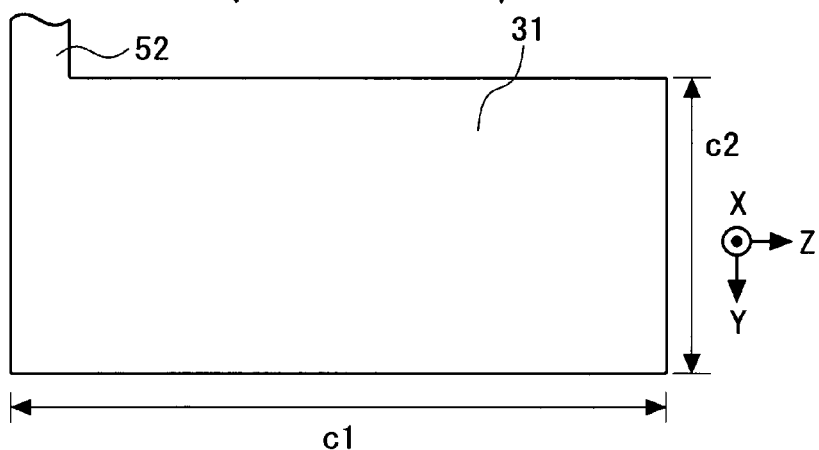
Figure 18C:
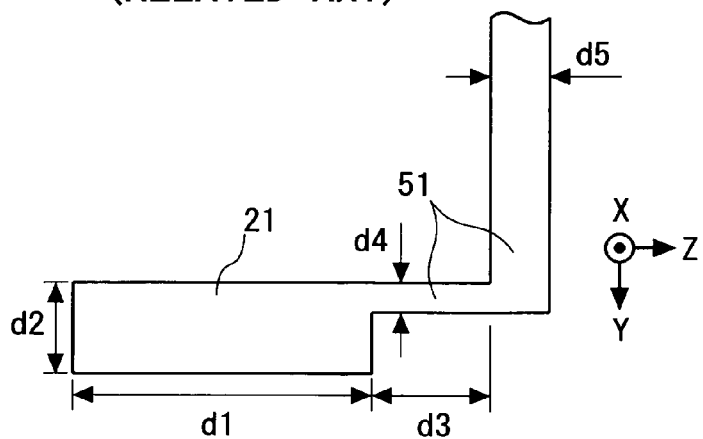

FIGS. 18A-18C illustrate a main portion of a magnetic head according to the first comparative example, and correspond to FIGS. 6A-6C, respectively. In FIGS. 18A-18C, machinery identical or corresponding to those in FIGS. 6A-6C are designated by the same reference numerals, and repetitive description thereon is omitted. FIG. 18A is a schematic plan view generally showing a positional relationship, when viewed in a laminating direction (X-axis direction), among a lower magnetic shield layer 21, an upper magnetic shield layer 31, a lower lead layer 51, an upper lead layer 52, and layers 24-28 of the magnetic head according to the first comparative example. FIG. 18B is a schematic plan view generally showing a positional relationship, when viewed in the laminating direction, between the upper magnetic shield layer 31 and upper lead layer 52 of the magnetic head according to the first comparative example. FIG. 18C is a schematic plan view generally showing a positional relationship, when viewed in the laminating direction, between the lower magnetic shield layer 21 and lower lead layer 51 of the magnetic head according to the first comparative example.

Figure 19A:
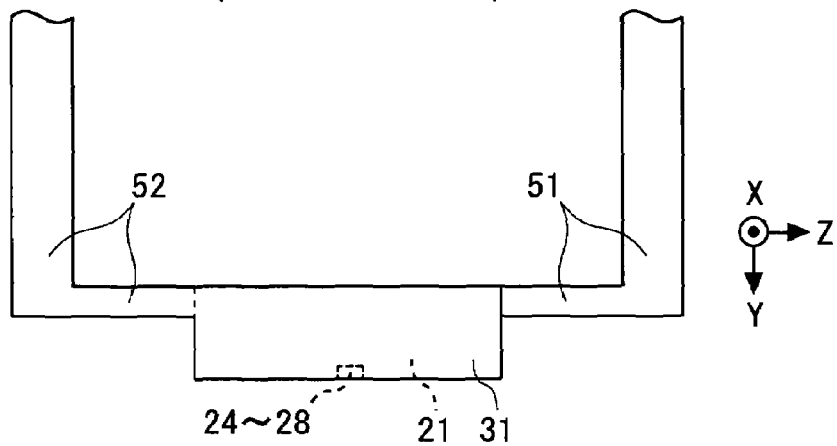
FIGS. 19A, 19B and 19C are diagrams illustrating magnetic shield layers, lead layers and the like in a magnetic head according to a second comparative example.
Figure 19B:
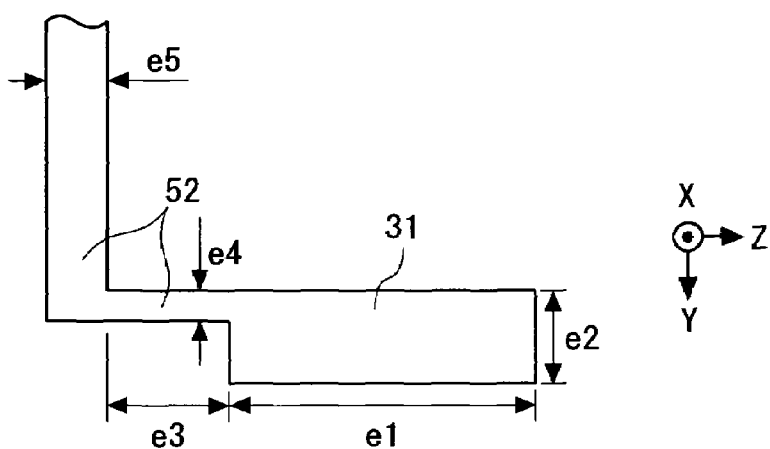
Figure 19C:
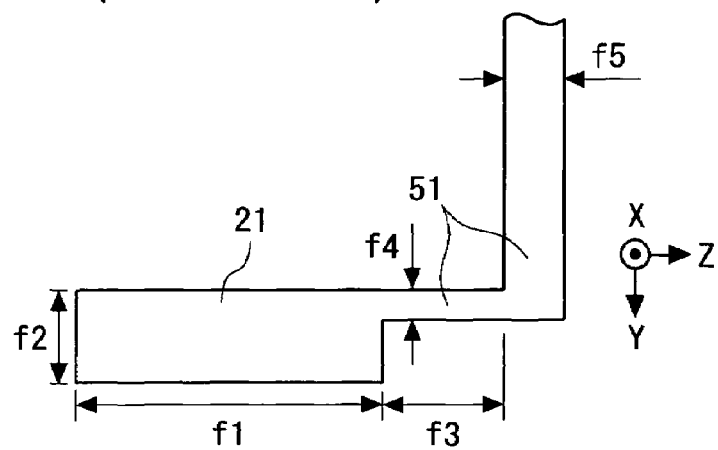

FIGS. 19A-19C illustrate a main portion of a magnetic head according to the second comparative example, and correspond to FIGS. 6A-6C, respectively. In FIGS. 19A-19C, components identical or corresponding to those in FIGS. 6A-6C are designated by the same reference numerals, and repetitive description thereon is omitted. FIG. 19A is a schematic plan view generally showing a positional relationship, when viewed in a laminating direction (X-axis direction), among a lower magnetic shield layer 21, an upper magnetic shield layer 31, a lower lead layer 51, an upper lead layer 52, and layers 24-28 of the magnetic head according to the second comparative example. FIG. 19B is a schematic plan view generally showing a positional relationship, when viewed in the laminating direction, between the upper magnetic shield layer 31 and upper lead layer 52 of the magnetic head according to the second comparative example. FIG. 19C is a schematic plan view generally showing a positional relationship, when viewed in the laminating direction, between the lower magnetic shield layer 21 and lower lead layer 51 of the magnetic head according to the second comparative example.

The first and second comparative examples basically differ from the first embodiment only in the structure related to the magnetic shield layers 21, 31 and lead layers 51, 52.

In the first embodiment, the magnetic shield layers 21, 31 are made of a magnetic material, while the lead layers 51, 52 are made of a non-magnetic conductive material. On the other hand, in the first and second comparative examples, the lower magnetic shield layer 21 and lower lead layer 51 are integrally and continuously made of the same magnetic material, and the upper magnetic shield layer 31 and upper lead layer 52 are integrally and continuously made of the same magnetic material.

Also, in the first embodiment, the lower magnetic shield layer 21 and upper magnetic shield layer 31 have their shapes and sizes which substantially exactly overlap each other when viewed in the laminating direction (X-axis direction), as illustrated in FIGS. 6A-6C. On the other hand, in the first comparative example, the upper magnetic shield layer 31 is larger than the lower magnetic shield 21 when viewed in the laminating direction (X-axis direction), as illustrated in FIGS. 18A-18C. In the second comparative example, the lower magnetic shield layer 21 and upper magnetic shield layer 31 have their shapes and sizes which substantially exactly overlap each other when viewed in the laminating direction (X-axis direction), as illustrated in FIGS. 19A-19C, as is the case with the aforementioned first embodiment.

The first comparative example corresponds to a conventional CPP-based magnetic head. The second comparative example corresponds to a modification to the magnetic head according to the first comparative example, which is made in accordance with the teaching in the aforementioned JP-A-2003-242613 such that the lower magnetic shield layer 21 and upper magnetic shield layer 31 have their shapes and sizes which substantially exactly overlap each other when viewed in the laminating direction.

It has been confirmed through an experiment, later described, that the correlation between the dynamic characteristics and static characteristics is higher and variations are reduced more in waveform asymmetry in the dynamic characteristics, in the order of the first embodiment, second comparative example, and first comparative example.

Now, description will be made on an exemplary method of manufacturing the magnetic head according to the first comparative example. In the following description, components identical or corresponding to those described in connection with the first embodiment are designated by the same reference numerals.

First, a wafer process is performed. Specifically, a wafer 101 made of $Al_2O_3$—TiC, SiC or the like is provided for making a base 15. Using the thin film forming technology and the like, the aforementioned layers are formed in a large number of magnetic head forming regions in matrix on the wafer 101 to provide the aforementioned structure.

The outline of the wafer process will be described with reference to FIGS. 20 to 26. FIGS. 20 to 26 are diagrams schematically illustrating respective steps which make up the wafer process, wherein FIGS. 20A to 26A are general plan views, respectively; FIGS. 20B to 26B are general cross-sectional views taken along lines E-E' in FIGS. 20A to 26A, respectively; and FIGS. 20C to 26C are general cross-sectional views taken along lines F-F' in FIGS. 20A to 26A, respectively.

In the wafer process, after an underlying layer 16 has been laminated on a wafer (substrate) 101, the lower magnetic shield layer 21, lower lead layer 51, and relay electrode formation layers 21', 21" are formed of the same magnetic material on the underlying layer 16 in batch by a plating method or the like, and the top surfaces of the layers 21, 51, 21', 21" are planarized by a CMP process (FIGS. 20A-20C). As illustrated in FIG. 20A, the lower magnetic shield layer 21, lower lead layer 51, and relay electrode formation layer 21' are integrally and continuously formed, whereas the relay electrode formation layer 21" is separated from the layers 21, 51, 21'. The relay electrode formation layer 21' constitutes a relay electrode which is connected to the bonding pad 5a, while the relay electrode formation layer 21" constitutes a relay electrode which is connected to the bonding pad 5b.

Figure 21B:
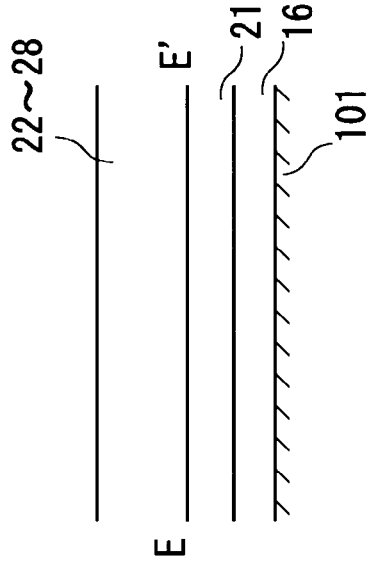
FIGS. 21A, 21B and 21C are diagrams schematically illustrating a further step which makes up the wafer process in the method of manufacturing the magnetic head according to the fist comparative example.
Figure 21C:
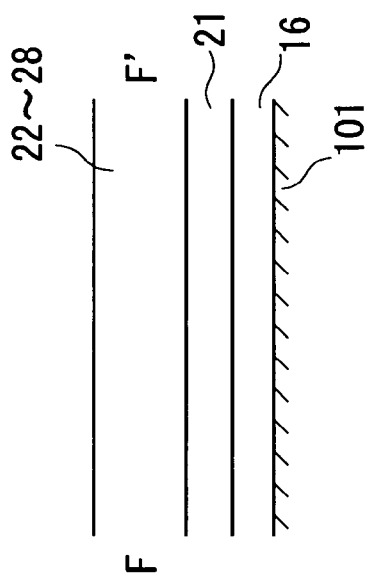
Figure 21A:
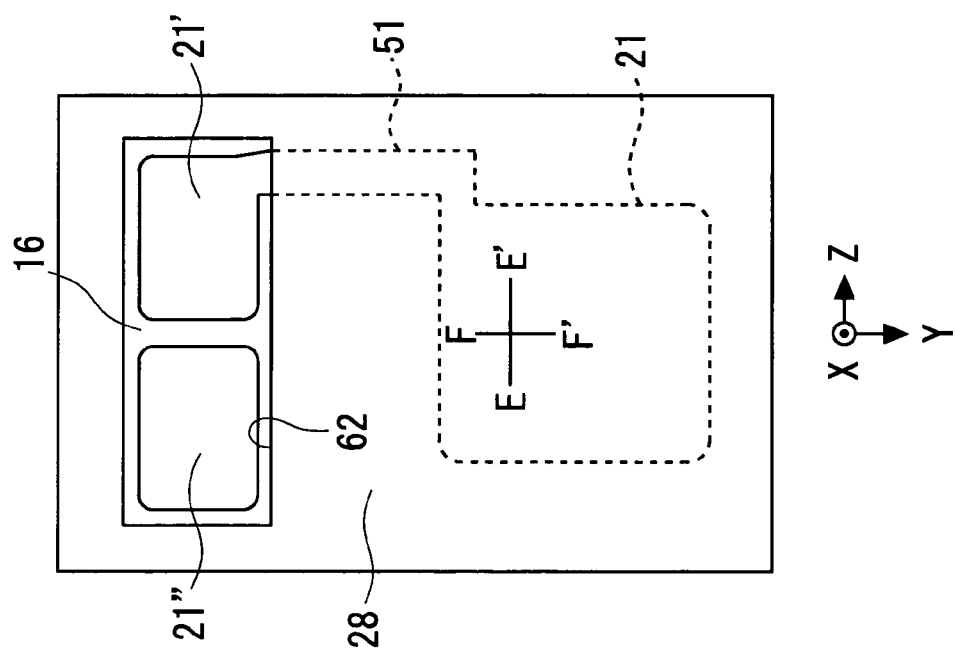

Subsequently, the lower metal layer 22, lower metal layer 23, pinning layer 24, pinned layer 25, tunnel barrier layer 26, free layer 27, and cap layer 28 are laminated in sequence on the substrate in the foregoing state by a sputtering method or the like. Then, partial regions of these layers 22-28 are removed by ion milling or the like to form an opening 62 through the layers 22-28 for exposing the relay electrode formation layers 21', 21" (FIGS. 21A-21C). The opening 62 acts to be a through-hole for a relay electrode connected to the bonding pad 5a and a relay electrode connected to the bonding pad 5b.

Next, after a photoresist 63 has been coated on the substrate in this state, the photoresist 63 is patterned to form openings 63a, 63b, through the photoresist 63, having a spacing in the Z-axis direction in accordance with a track width of the TMR device 2 (FIGS. 22A-22C).

Figure 23B:
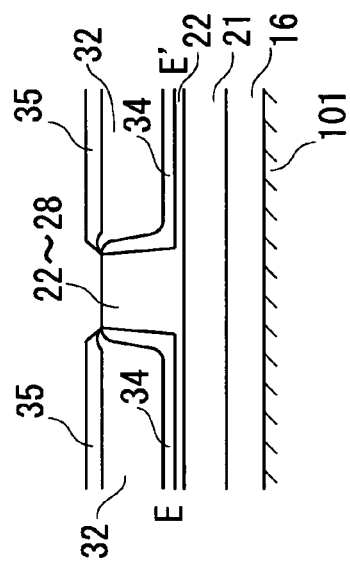
FIGS. 23A, 23B and 23C are diagrams schematically illustrating a further step which makes up the wafer process in the method of manufacturing the magnetic head according to the fist comparative example.
Figure 23C:
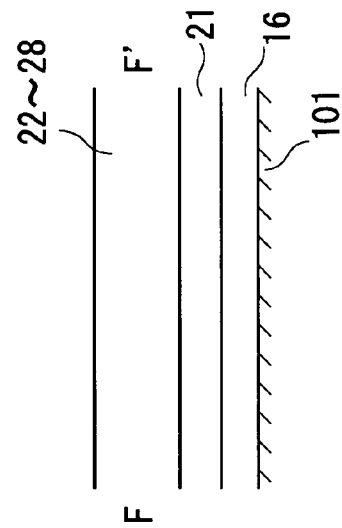
Figure 23A:
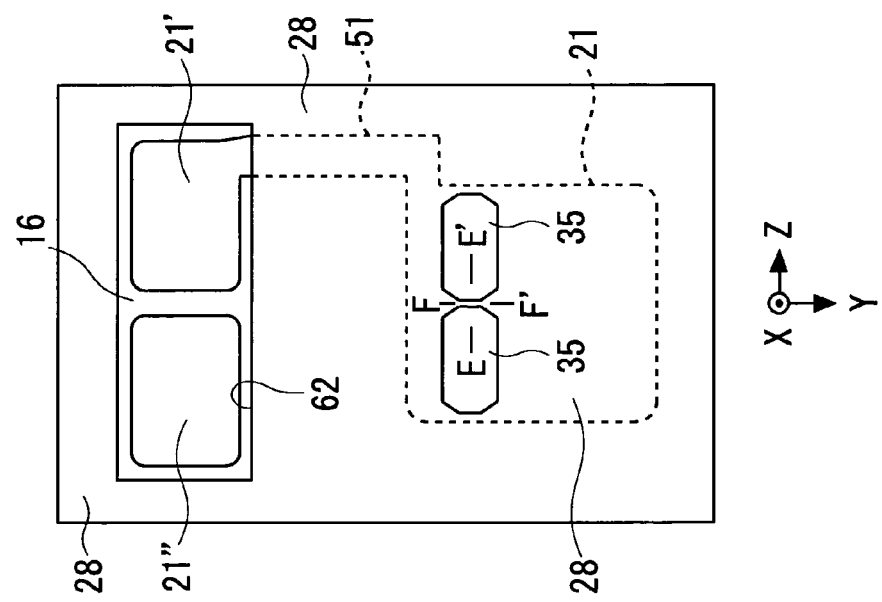

Subsequently, regions of the layers 23-28 which fall within the openings 63a, 63b are removed by ion milling or the like using the photoresist 63 as a mask. Next, before peeling off the photoresist 63, an insulating layer 34, a vertical biasing layer 32, and an insulating layer 35 are formed in sequence, and the photoresist 63 is peeled off together with the layers 34, 32, 35 which have been formed on the photoresist 63 (FIGS. 23A-23C). With the lift-off performed as described above, the layers 34, 32, 35 are formed only in regions of the layers 23-28 which have been removed.

Figure 24B:
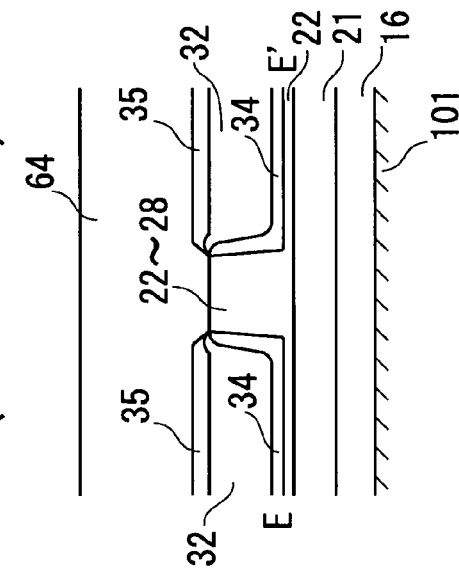
FIGS. 24A, 24B and 24C are diagrams schematically illustrating a further step which makes up the wafer process in the method of manufacturing the magnetic head according to the fist comparative example.
Figure 24C:
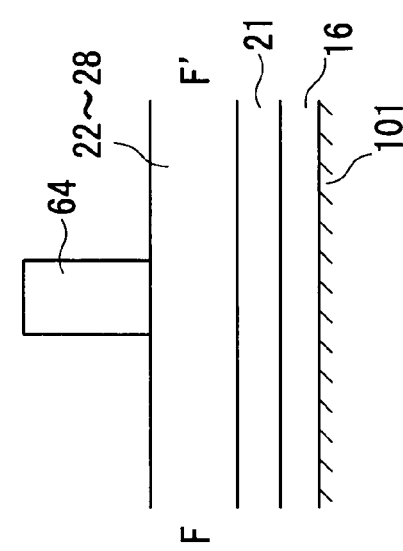
Figure 24A:
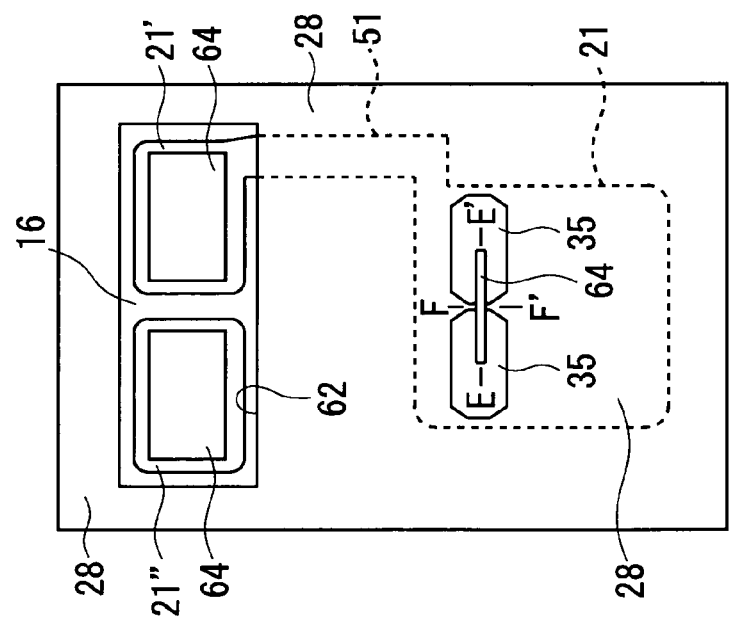

Next, after a photoresist 64 has been coated on the substrate in this state, the photoresist 64 is patterned into an insular shape only on a strip-shaped region which has a required width (width in the Y-axis direction) with respect to the height direction of the TMR device 2 and extends by a predetermined length in the Z-axis direction, on the area of the relay electrode formation layer 21', and on the area of the relay electrode formation layer 21" (FIGS. 24A-24C).

Subsequently, the layers 22-28 and the like in regions in which the photoresist 64 is not formed are removed by ion milling or the like using the photoresist 64 as a mask. Next, before the photoresist 64 is peeled off, an insulating layer 30 is formed, and the photoresist 64 is peeled off together with the layer 30 formed on the photoresist 64 (FIGS. 25A-25C). With the lift-off performed as described above, the layer 30 is formed only in regions which were not masked by the photoresist 64 during the milling.

Figure 26B:
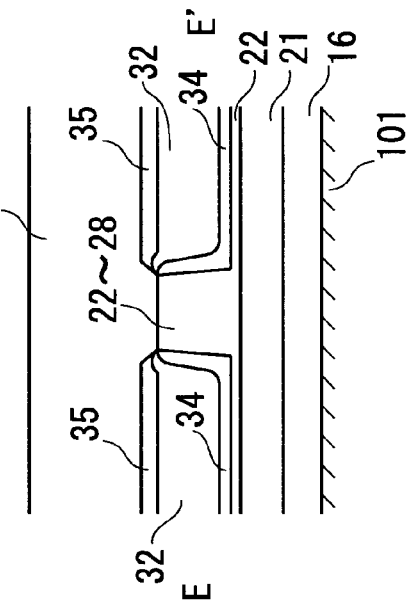
FIGS. 26A, 26B and 26C are diagrams schematically illustrating a further step which makes up the wafer process in the method of manufacturing the magnetic head according to the fist comparative example.
Figure 26C:
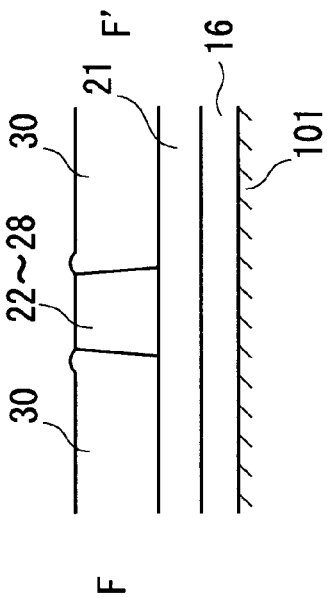
Figure 26A:
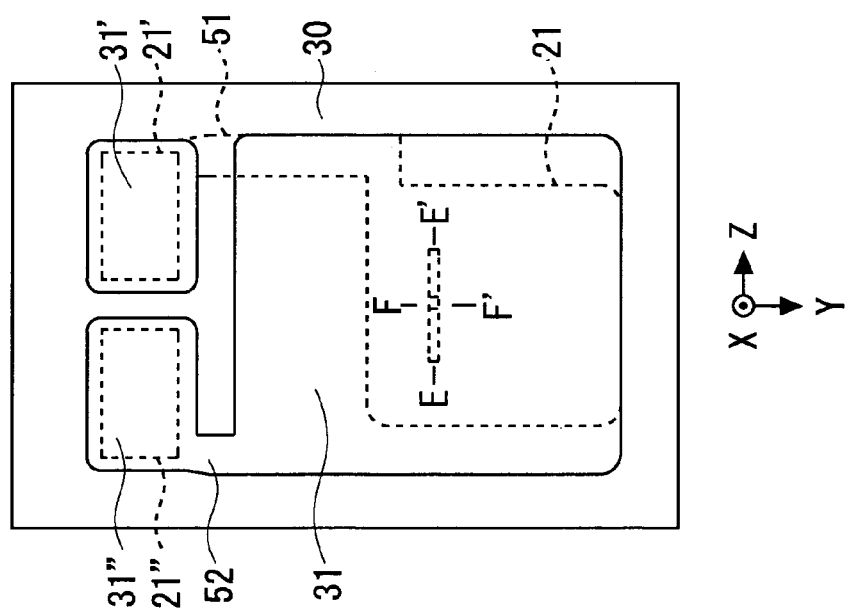

Next, the upper magnetic shield layer 31, upper lead layer 52, and relay electrode formation layers 31', 31" are formed of the same magnetic material in batch by a plating method or the like (FIGS. 26A-26C). As illustrated in FIG. 26A, the upper magnetic shield layer 31, upper lead layer 52, and relay electrode formation layer 31" are integrally and continuously formed, whereas the relay electrode formation layer 31' is separated from the layers 31, 52, 31".

Finally, the gap layer 38, coil layer 37, insulating layer 39, upper magnetic layer 36, and protection layer 40 are formed, and the electrodes 5a-5d and the like are formed. By now, the wafer process is completed.

Next, magnetic heads according to the first comparative example are completed through a known process for the wafer which has undergone the wafer process. Briefly describing, each bar (bar-shaped magnetic head aggregate) having a plurality of magnetic heads arranged in a line on the base is sawed from the wafer. Next, the bar is lapped on its ABS side for setting a throat height, an MR height, and the like for the bar. The surface finally exposed by the lapping is a cross section substantially along a line E-E' in FIG. 26A. Next, a protection film 4 is formed on the surface of the ABS side, and rails 11, 12 are formed by etching or the like. Finally, the bar is cut by machining into individual magnetic heads. In this manner, the magnetic heads according to the first comparative example are completed.

The foregoing description has been made on the method of manufacturing the magnetic head according to the first comparative example. For manufacturing the magnetic head according to the second comparative example, in the process described with reference to FIGS. 26A-26C in the method of manufacturing the magnetic head according to the first comparative example, the upper magnetic shield layer 31 and upper lead layer 52 are changed in pattern to that illustrated in FIG. 27A. The remaining processes are the same irrespective of whether the magnetic head is manufactured according to the first comparative example or second comparative example.

Figure 27B:
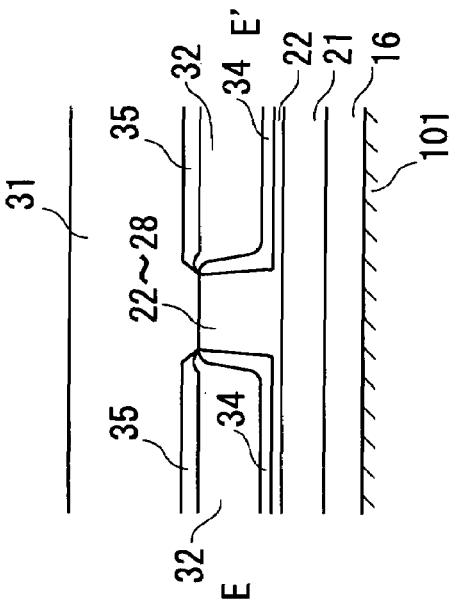
FIGS. 27A, 27B and 27C are diagrams schematically illustrating a step which makes up a wafer process in a method of manufacturing the magnetic head according to the second comparative example.
Figure 27C:
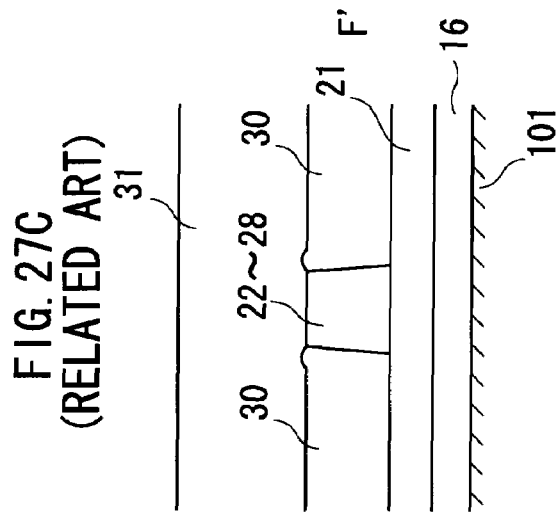
Figure 27A:
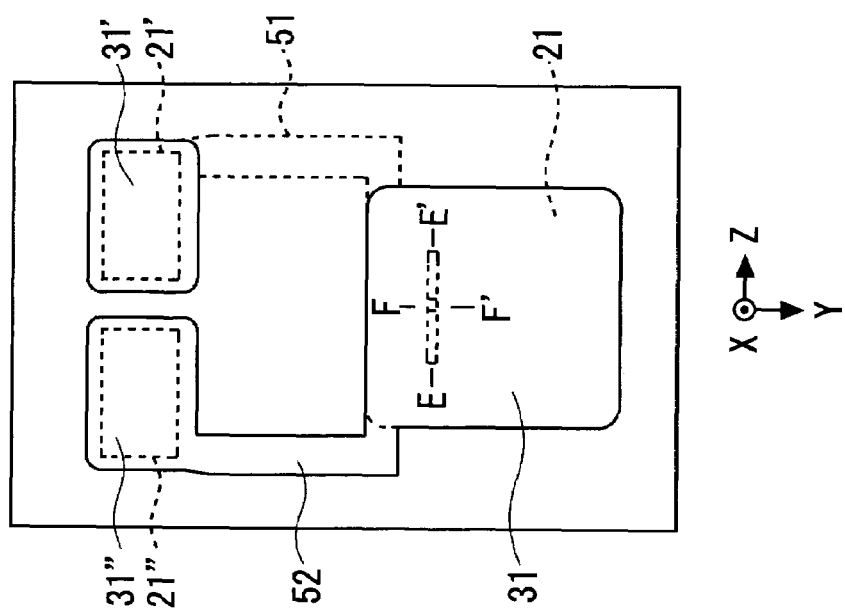

FIGS. 27A-27C are diagrams schematically illustrating a step which makes up the wafer process in the method of manufacturing the magnetic head according to the second comparative example, and correspond to FIGS. 27A-27C, respectively. FIG. 27A is a schematic plan view, FIG. 27B is a schematic cross-sectional view taken along a line E-E' in FIG. 27A, and FIG. 27C is a schematic cross-sectional view taken along a line F-F' in FIG. 27A.

Next, a magnetic disk apparatus according to a second embodiment of the present invention will be described with reference to FIG. 28.

Figure 28:
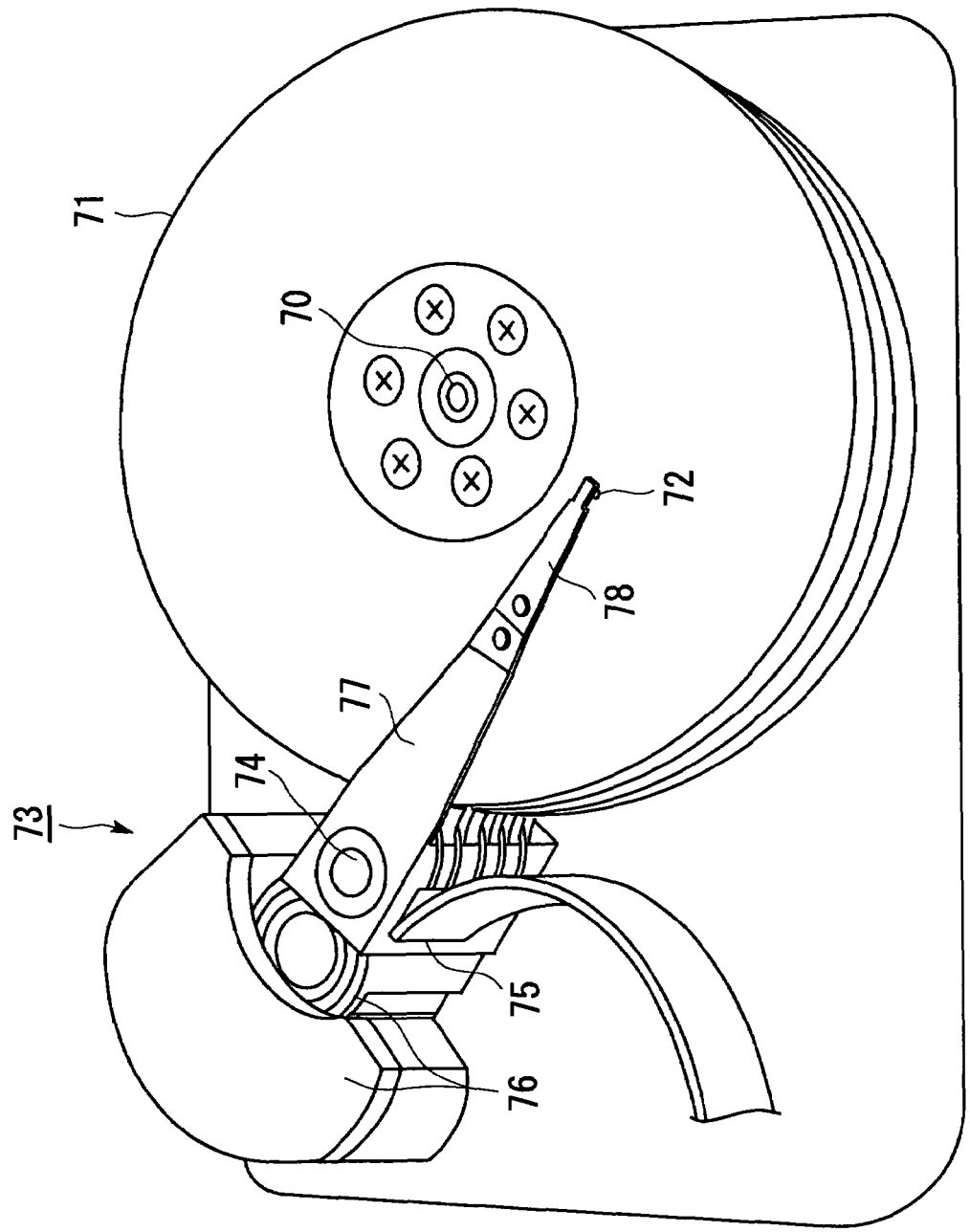
FIG. 28 is a perspective view generally illustrating the configuration of a main portion of a magnetic disk apparatus according to a second embodiment of the present invention.

FIG. 28 is a perspective view generally illustrating the configuration of a main portion of a magnetic disk apparatus according to a second embodiment of the present invention.

The magnetic disk apparatus according to the second embodiment comprises magnetic disks 71 rotatably mounted about a shaft 70; magnetic heads 72 each for recording and reproducing information to or from associated one of the magnetic disks 71; and an assembly carriage device 73 for positioning the magnetic head 72 on a track of the magnetic disk 71.

The assembly carriage device 73 mainly comprises a carriage 75 mounted for pivotal movements about a shaft 74; and an actuator 76 comprised, for example, of a voice coil motor (VCM) for rotating the carriage 75.

The carriage 75 is mounted with bases of a plurality of driving arms 77 which are stacked in the direction of the shaft 74. A head suspension assembly 78 is secured at the leading end of each driving arm 77. Each head suspension assembly 78 has the magnetic head 72 mounted on the leading end thereof. Each head suspension assembly 78 is attached to the leading end of the driving arm 77 such that the associated magnetic head 72 opposes the surface of the associated magnetic disk 71.

In the second embodiment, the magnetic disk apparatus comprises the magnetic heads according to the first to fourth embodiments described above as the magnetic heads 72. Therefore, the magnetic disk apparatus according to the second embodiment can advantageously increase the recording density.

Approximately 100 samples were manufactured by the respective manufacturing methods described above for each of the magnetic head according to the first embodiment of the present invention, the magnetic head according to the first comparative example, and the magnetic head according to the second comparative example. The same conditions were set in the same processes for manufacturing the respective magnetic heads. Any sample of any magnetic head was mainly composed of layers as listed in the following Table 1.

TABLE 1

| Name of Layer and Reference Numeral in Drawings | Composition and Thickness of Layer (When composed of two layers or more, a layer more to the left is positioned lower (near the substrate)) |
|---|---|
| Upper Magnetic shield Layer 31 (serving also as Upper Electrode) | NiFe (2 μm) |
| Insulating Layer 30 | $Al_2O_3$ |
| Upper Insulating Layer 35 | $Al_2O_3$ (30 nm) |
| Vertical Biasing Layer 32 | CrTi (5nm) /CoCrPt (35 nm) |
| Lower Insulating Layer 34 | $Al_2O_3$ (10 nm) |
| Cap Layer 28 | Ta (18 nm) |

TABLE 1-continued

| Name of Layer and Reference Numeral in Drawings | Composition and Thickness of Layer (When composed of two layers or more, a layer more to the left is positioned lower (near the substrate)) |
|---|---|
| Free Layer 27 | CoFe (2 nm) /NiFe(3 nm) |
| Tunnel Barrier Layer 26 | $Al_2O_3$ (0.6 nm) |
| Pinned Layer 25 | CoFe (2 nm) /Ru (0.8 nm) /CoFe (4 nm) |
| Pining layer 24 | PtMn (15 nm) |
| Lower Metal Layer 23 | NiFe (2 nm) |
| Lower Metal Layer 22 | Ta (5 nm) |
| Lower Magnetic shield Layer 21 (serving also as Lower Electrode) | NiFe( 2 μm) |

In the samples of the magnetic head according to the first embodiment, each of the lead layers 51, 52 was trilayer film of Ta (10 nm)/Cu (200 nm)/Ta (100 nm). In the samples of the magnetic heads according to the first and second comparative examples, each of lead layers 51, 52 was made of NiFe of 2 μm thick, like the upper magnetic shield layer 31 in Table 1.

In the samples of the magnetic head according to the first embodiment, the dimensions of the respective parts shown in FIGS. 6A-6C were chosen as follows: a1=b1=50 μm, and a2=b2=15 μm. In the samples of the magnetic head according to the first comparative example, the dimensions of the respective parts shown in FIGS. 18A-18C were chosen as follows: c1=100 μm, c2=76 μm, d1=50 μm, d2=15 μm, d3=25 μm, d4=5 μm, and d5=10 μm. In the samples of the magnetic head according to the second comparative example, the dimensions of the respective parts shown in FIGS. 19A-19C were chosen as follows: e1=f1=50 μm, e2=f2=15 μm, e3=f3=25 μm, e4=f4=5 μm, and e5=f5=10 μm.

For each sample of each magnetic head, when a bar (bar-shaped magnetic head aggregate) was cut out, the static characteristics were measured using a quasi static tester (QST). In this static characteristic measurement, an alternating magnetic field (+/−140 Oe) was applied in a direction perpendicular to the ABS side surface of the bar while a sense current of 0.1 mA was applied, to measure the resistance and MR output (output voltage) of the TMR device 2.

Also, for each sample of each magnetic head, when each magnetic head was completed, the dynamic characteristics were measured using a dynamic performance (DP) tester (read write tester). In this dynamic characteristic measurement, a magnetic disk was rotated at 5400 rpm, a maximum measurement frequency was set at 225 MHz in this measurement, a magnetic head traced the magnetic disk on the radius of 28.5 mm, a flying height was set to 10 nm, the coercive force Hc of the magnetic disk was set to 3950 Oe, Mrt of the magnetic disk was set to 0.33 memu/cm², and a bias voltage was set to 200 mV.

The results brought about by these dynamic characteristic measurement and static characteristic measurement were shown in FIGS. 29 to 31 and 33 to 38.

Figure 29:
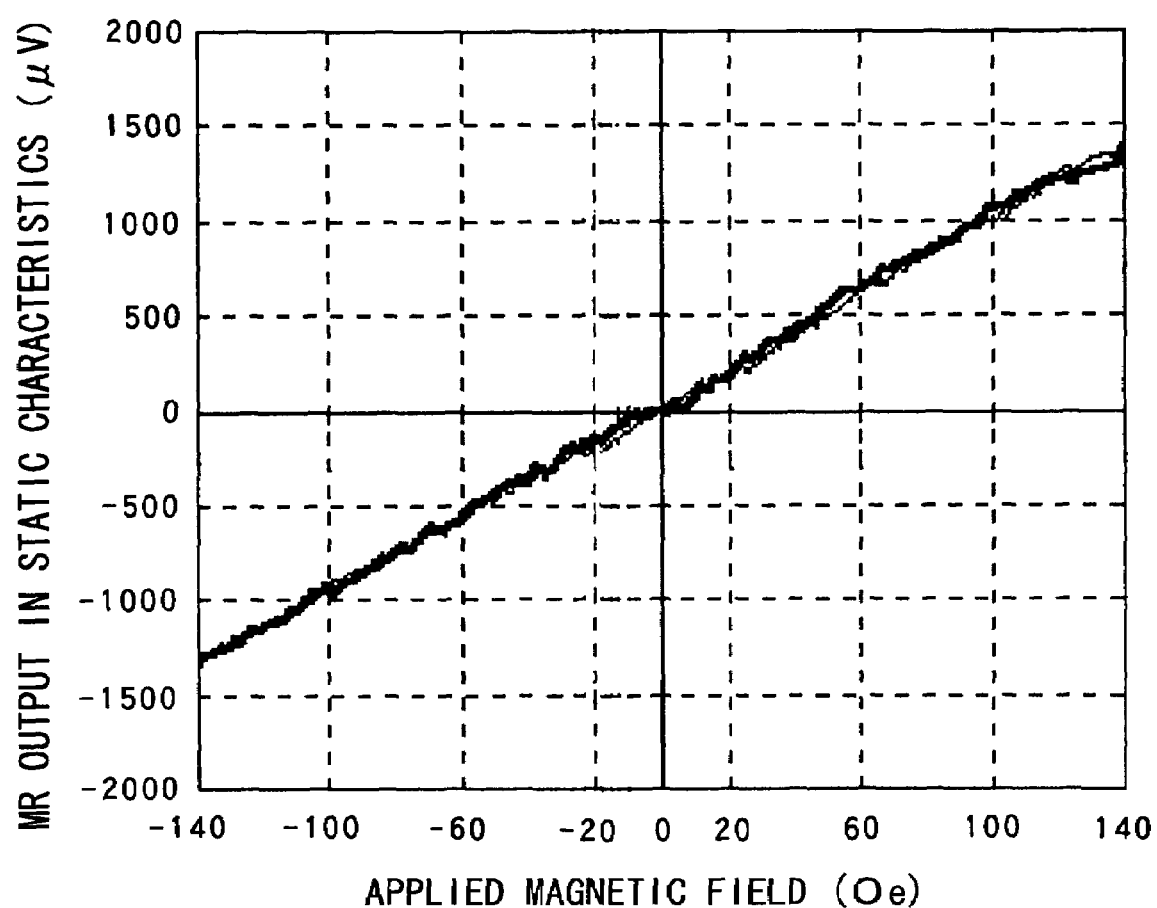
FIG. 29 is a graph showing a hysteresis curve resulting from a static characteristic measurement for a sample of the magnetic head according to the first embodiment.

FIG. 29 shows typical one of hysteresis curves derived in the static characteristic measurement for respective samples of the magnetic head according to the first embodiment. This hysteresis curve is ideal because it is quite close to a straight line indicative of a linear response.

Figure 30:
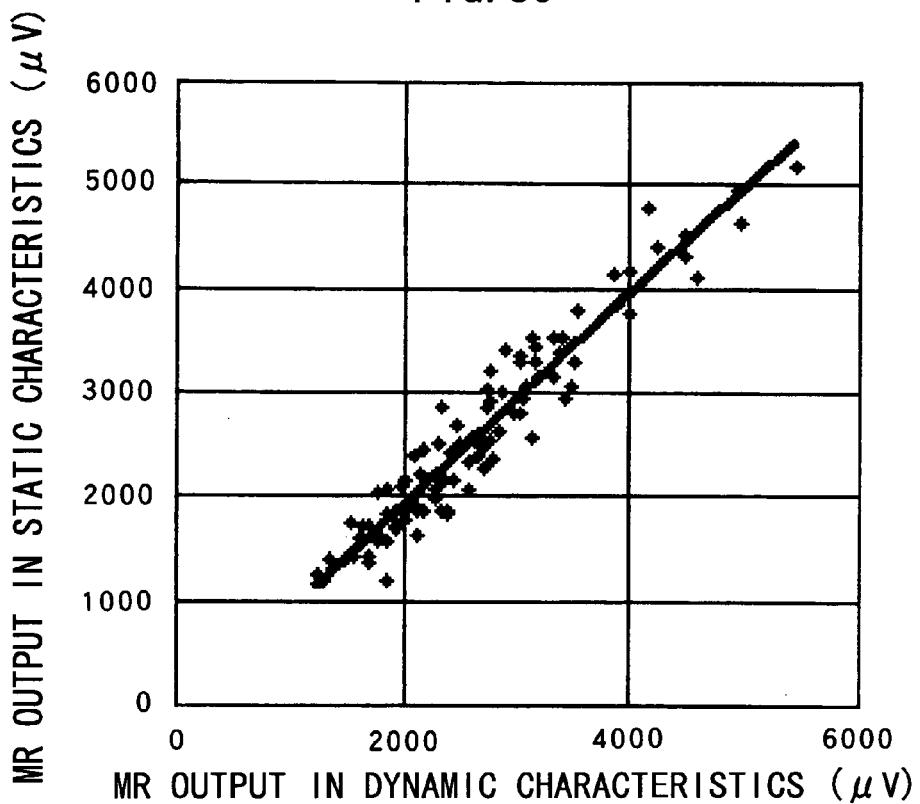
FIG. 30 is a scatter diagram showing the relationship between an MR output in the static characteristics and an output in the dynamic characteristics for each sample of the magnetic head according to the first embodiment.

FIG. 30 is a scatter diagram showing the relationship between the MR output in the static characteristics and the output in the dynamic characteristics for each sample of the magnetic head according to the first embodiment. The horizontal axis in FIG. 30 represents the MR output derived in the dynamic characteristic measurement (note that the measurement was made at a frequency lower by a factor of six than the maximum measurement frequency, and the MR output (output reproduced from the magnetic head) was averaged over one cycle of the magnetic disk). The vertical axis in FIG. 30 represents the MR output derived in the static characteristic measurement (note that this MR output is the MR output generated when the magnetic head was applied with a magnetic field simulating a magnetic field with which the magnetic head is applied during the dynamic characteristic measurement). An oblique straight line in FIG. 30 shows a collection of approximated sample points. As shown in FIG. 30, the sample points concentrate on the approximated straight line, and the value of the squared correlation coefficient calculated from the data shown in FIG. 30 is 0.9178 which is quite large. From this result, it can be appreciated that the correlation between the static characteristics and dynamic characteristics is extremely high in the first embodiment.

Figure 31:
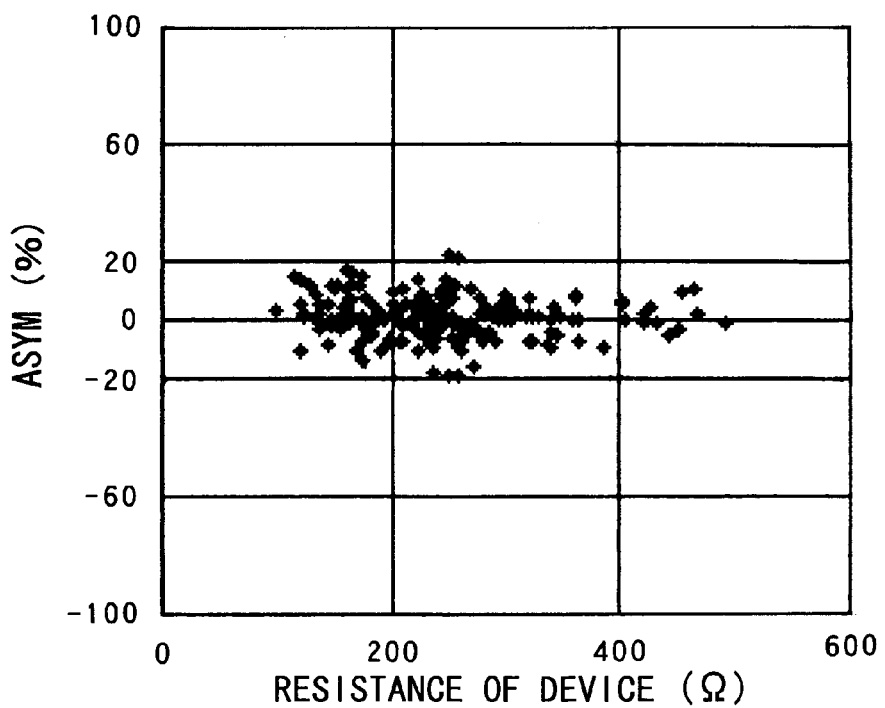
FIG. 31 is a scatter diagram showing the relationship between the resistance of the device and the waveform asymmetry value for each sample of the magnetic head according to the first embodiment.

FIG. 31 is a scatter diagram showing the relationship between the resistance of the device and the waveform asymmetry value Asym for each sample of the magnetic head according to the first embodiment. As shown in FIG. 31, the values Asym of sample points concentrate near zero. Thus, in the first embodiment, the waveform asymmetry in the dynamic characteristics exhibits few variations, and moreover, the value Asym of each sample point is quite close to zero, and is therefore ideal.

Figure 32:
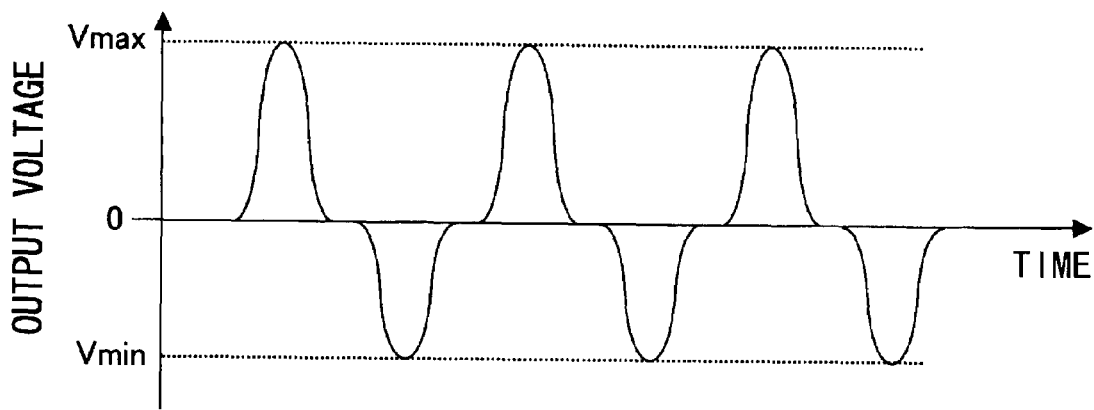
FIG. 32 is a waveform chart schematically showing the waveform of an output voltage resulting from a dynamic characteristic measurement.

Here, the definition of the value Asym of the waveform asymmetry will be described with reference to FIG. 32. FIG. 32 is a waveform chart schematically showing the waveform of the output voltage (MR output waveform) resulting from the dynamic characteristic measurement. As shown in FIG. 32, the value Asym of the waveform asymmetry is expressed by the following equation (1)

$$Asym = \frac{|V\max| - |V\min|}{|V\max| + |V\min|} \times 100[\%] \quad (1)$$

where Vmax is a peak value of a positive pulse of this output voltage waveform, and Vmin is a peak value of negative pulse.

Figure 33:
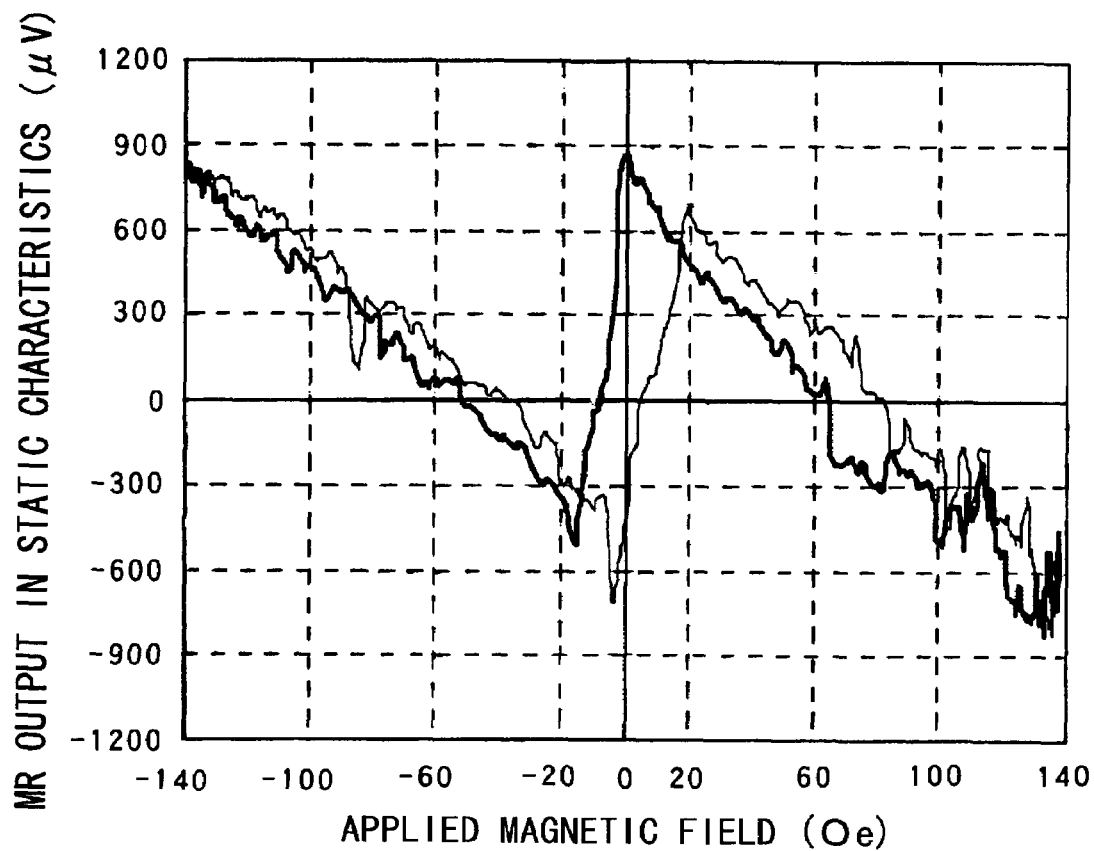
FIG. 33 is a graph showing a hysteresis curve resulting from a static characteristic measurement for a sample of the magnetic head according to the first comparative example.

FIG. 33 shows typical one of hysteresis curves derived in the static characteristic measurement for respective samples of the magnetic head according to the first comparative example. This hysteresis curve is quite far from a straight line indicative of an ideal linear response.

Figure 34:
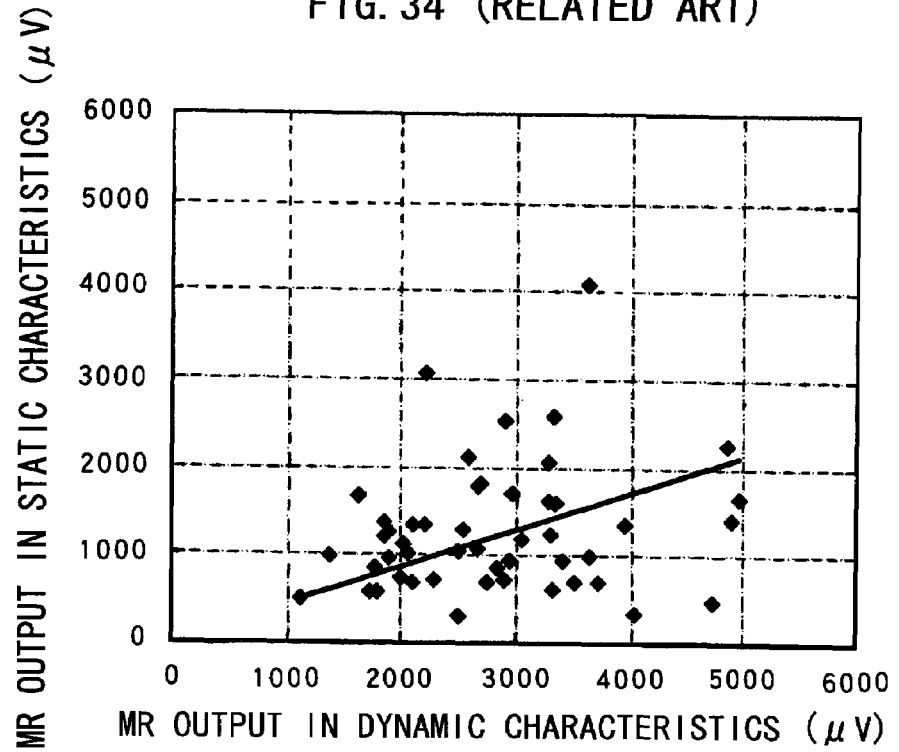
FIG. 34 is a scatter diagram showing the relationship between an MR output in the static characteristics and an output in the dynamic characteristics for each sample of the magnetic head according to the first comparative example.

FIG. 34 shows a scatter diagram showing the relationship between the MR output in the static characteristics and the output in the dynamic characteristics of each sample of the magnetic head according to the first comparative example. The horizontal axis and vertical axis in FIG. 34 are the same as those in FIG. 30, respectively. An oblique straight line in FIG. 34 shows a collection of approximated sample points. As shown in FIG. 34, the sample points largely scatter, and the value of the squared correlation coefficient calculated from the data shown in FIG. 34 is 0.0979 which is quite small. From this result, it can be appreciated that the correlation between the static characteristics and dynamic characteristics is extremely low in the first comparative example.

Figure 35:
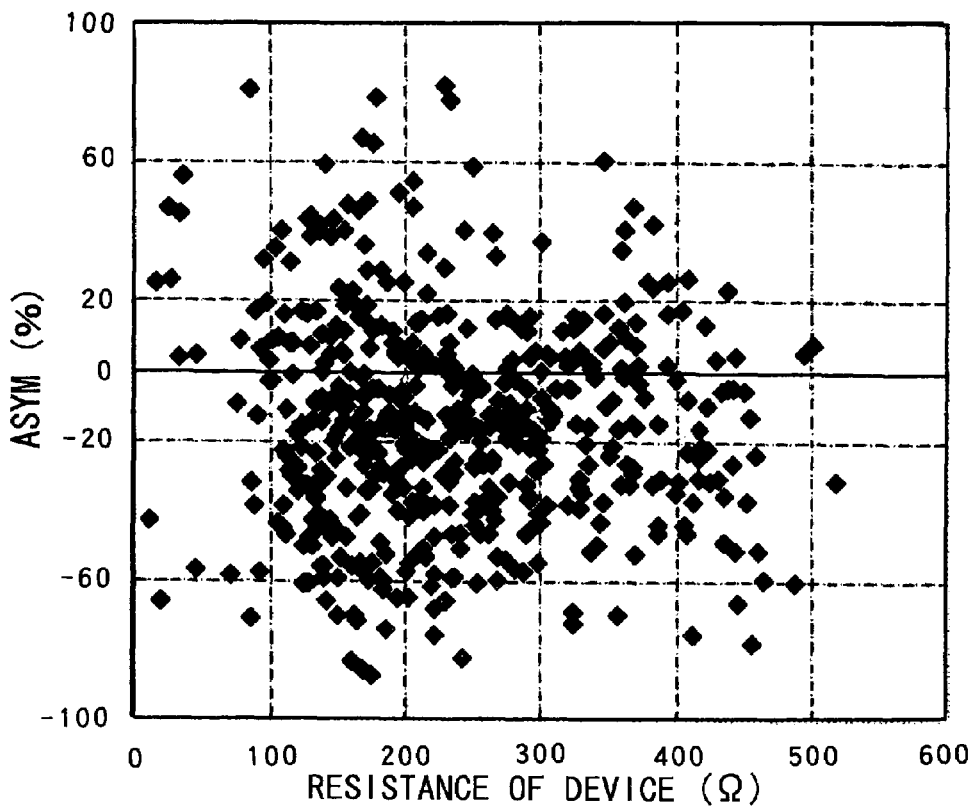
FIG. 35 is a scatter diagram showing the relationship between the resistance of the device and the waveform asymmetry value for each sample of the magnetic head according to the first comparative example.

FIG. 35 is a scatter diagram showing the relationship between the resistance of the device and the waveform asymmetry value Asym for each sample of the magnetic head according to the first comparative example. As shown in FIG. 35, the values Asym of sample points quite largely scatter in whole. Therefore, in the first comparative example, the waveform asymmetry in the dynamic characteristics exhibits very large variations, and there are a large number of sample points of which the values Asym are quite far from the ideal value of zero.

Figure 36:
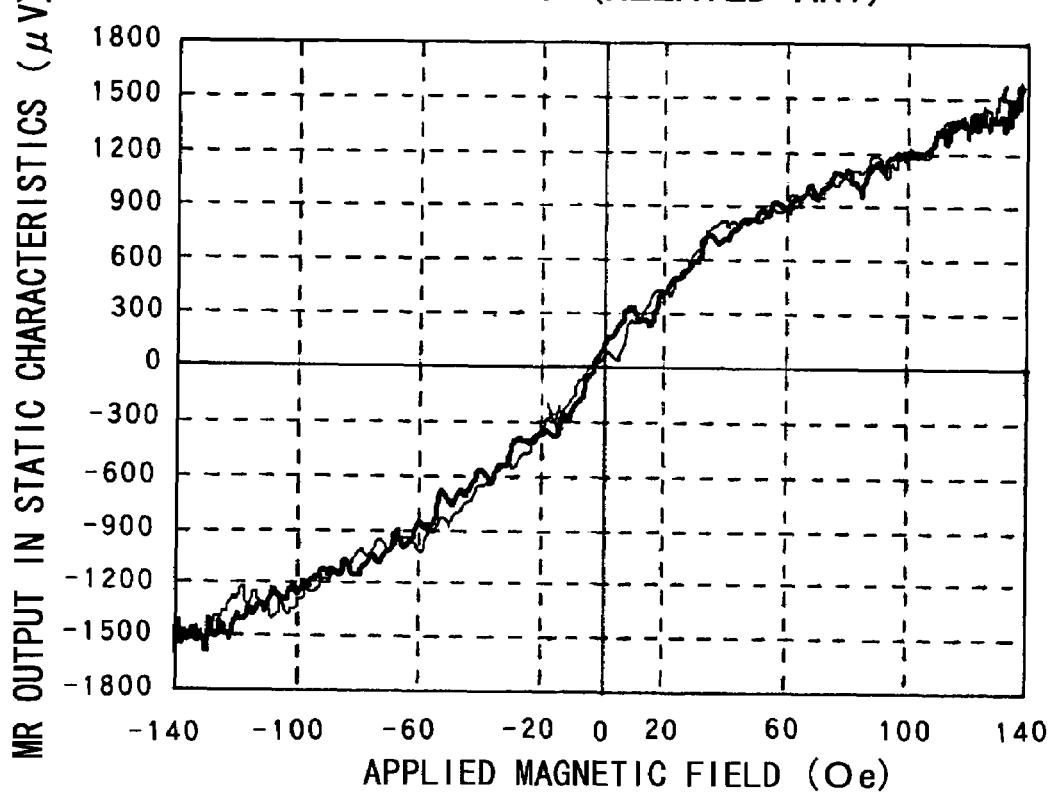
FIG. 36 is a graph showing a hysteresis curve resulting from a static characteristic measurement for a sample of the magnetic head according to the second comparative example.

FIG. 36 shows typical one of hysteresis curves derived in the static characteristic measurement for respective samples of the magnetic head according to the second comparative example. This hysteresis curve approaches to the straight line indicative of the ideal linear response as compared with the hysteresis curve shown in FIG. 33 related to the first comparative example, but is far from the straight line indicative of the ideal linear response as compared with the hysteresis curve shown in FIG. 29 related to the first embodiment.

Figure 37:
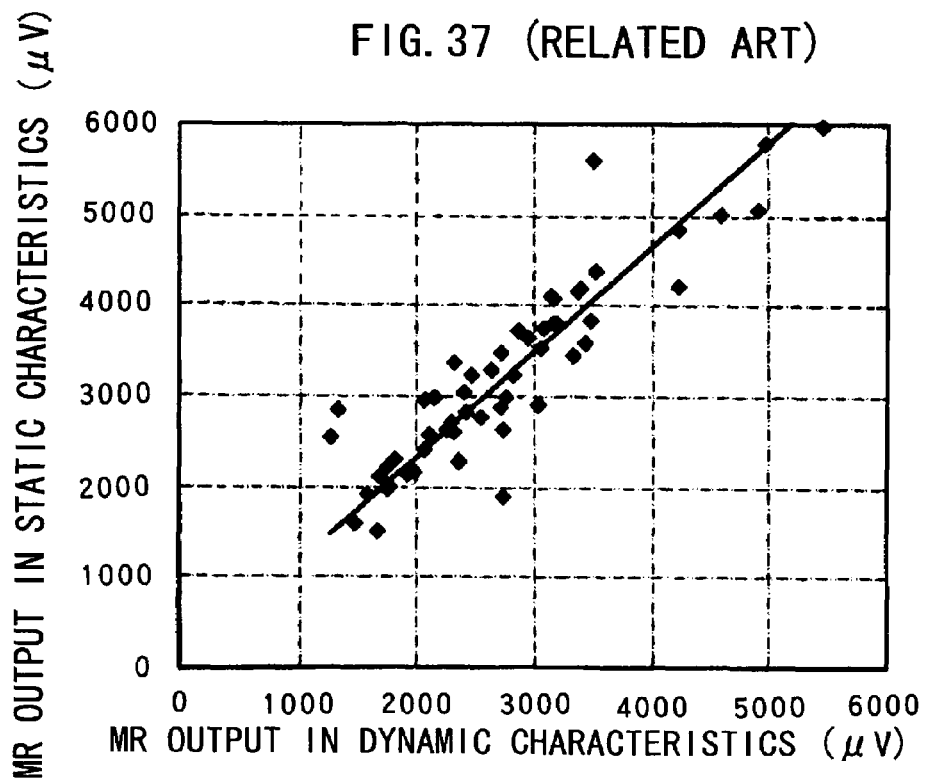
FIG. 37 is a scatter diagram showing the relationship between an MR output in the static characteristics and an output in the dynamic characteristics for each sample of the magnetic head according to the second comparative example.

FIG. 37 shows a scatter diagram showing the relationship between the MR output in the static characteristics and the output in the dynamic characteristics of each sample of the magnetic head according to the second comparative example. The horizontal axis and vertical axis in FIG. 37 are the same as those in FIG. 30, respectively. An oblique straight line in FIG. 37 shows a collection of approximated sample points. In FIG. 37, though the sample points do not scatter as largely as those in FIG. 34 related to the first comparative example, the sample points do not concentrate so much as those shown in FIG. 29 related to the first embodiment. Also, the value of the squared correlation coefficient calculated from the data shown in FIG. 37 is 0.7974 which is larger than the value 0.0979 calculated from the data shown in FIG. 34 related to the first comparative example, but is smaller than the value 0.9178 calculated from the data shown in FIG. 30 related to the first embodiment. From this result, it can be appreciated that the second comparative example has a correlation between the static characteristics and dynamic characteristics higher than that of the first comparative example, but lower than that of the first embodiment.

Figure 38:
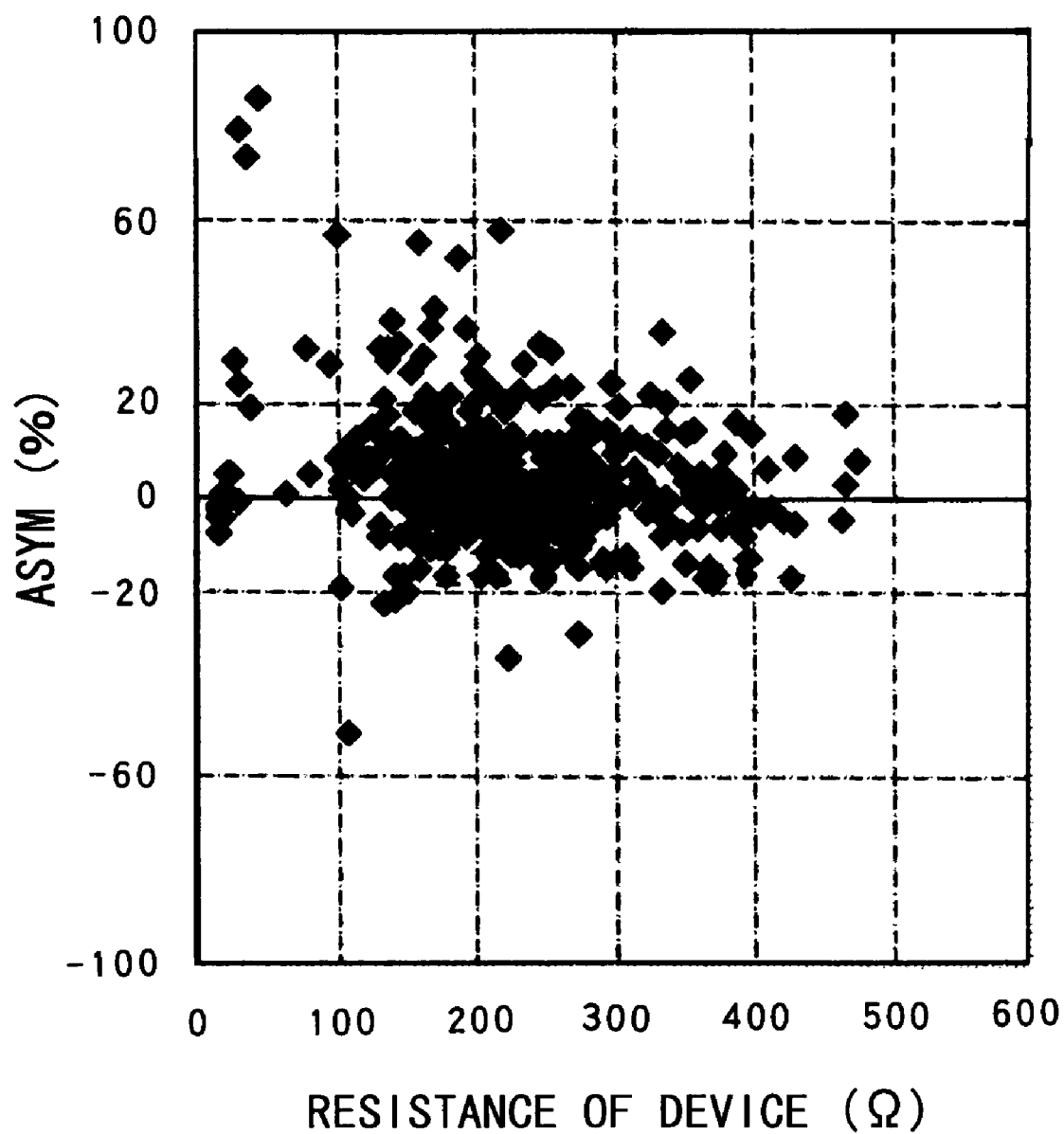
FIG. 38 is a scatter diagram showing the relationship between the resistance of the device and the waveform asymmetry value for each sample of the magnetic head according to the second comparative example.

FIG. 38 is a scatter diagram showing the relationship between the resistance of the device and the waveform asymmetry value Asym for each sample of the magnetic head according to the second comparative example. In FIG. 38, the values Asym of sample points do not scatter as large as those in FIG. 35 related to the first comparative example, but do not concentrate so much as those in FIG. 31 related to the first embodiment. Thus, it can be understood that in the second comparative example, the wave asymmetry in the dynamic characteristics varies smaller than the first comparative example, but larger than the first embodiment.

As described above, it was found from the foregoing results of the experiments that the correlation between the dynamic characteristics and static characteristics is higher and variations are reduced more in the waveform asymmetry in the dynamic characteristics, in the order of the first embodiment, second comparative example, and first comparative example.

As described above, although the explanation has been made as to the respective embodiments and examples according to the present invention, the present invention is not limited thereto.

For example, while the foregoing embodiment shows an example of applying the present invention to a TMR head, the present invention can be applied as well to other heads having CPP-based magneto-resistive device such as a CPP-GMR head. For example, in the magnetic head according to the first embodiment, the tunnel barrier layer 26 may be replaced with a non-magnetic metal layer formed of Cu, Au, Ag or the like, in which case the device 2 can be a CPP-GMR device, and the magnetic head can be CPP-GMR head.

As described above, the present invention can provide a CPP-based magnetic head which can further increase the correlation between the dynamic characteristics and static characteristics even if the shield gap is narrowed down for a higher recording density, as well as a head suspension assembly and a magnetic disk apparatus using the magnetic head.

What is claimed is:

1. A magnetic head comprising:
   a base;
   a first magnetic shield layer, a magneto-resistive layer, and a second magnetic shield layer laminated on said base in this order; and
   a first and a second lead layer for applying a sense current to said magneto-resistive layer in a direction substantially perpendicular to a film plane in said magneto-resistive layer through said first and second magnetic shield layers,
   wherein said first and second magnetic shield layers have shapes and sizes which substantially overlap each other when viewed in a laminating direction,
   said first lead layer is electrically connected to said first magnetic shield layer, and at least a first portion of said first lead layer is made of a non-magnetic conductive material, the first portion of said first lead layer being closer to said first magnetic shield layer than an other portion of said first lead layer,
   said second lead layer is electrically connected to said second magnetic shield layer, and at least a first portion of said second lead layer is made of a non-magnetic conductive material, the first portion of said second lead layer being closer to said second magnetic shield layer than an other portion of said second lead layer,
   said first lead layer does not intervene between said first magnetic shield layer and said magneto-resistive layer in the laminating direction, and does not overlap with said magneto-resistive layer in the laminating direction,
   said second lead layer does not intervene between said second magnetic shield layer and said magneto-resistive layer in the laminating direction, and does not overlap with said magneto-resistive layer in the laminating direction,
   a second portion of said first lead layer overlaps with both of said first and second magnetic shield layers when viewed in the laminating direction, and
   a second portion of said second lead layer overlaps with both of said first and second magnetic shield layers when viewed in the laminating direction.

2. The magnetic head according to claim 1, wherein said first and second magnetic shield layers have substantially a same thickness.

3. The magnetic head according to claim 2, wherein said first and second magnetic shield layers are made of a same material.

4. The magnetic head according to claim 3, wherein said magneto-resistive layer includes a tunnel barrier layer, a free layer formed on one surface side of said tunnel barrier layer, a pinned layer formed on an other surface side of said tunnel barrier layer, and a pinning layer formed on one surface side of said pinned layer opposite to said tunnel barrier layer.

5. The magnetic head according to claim 3, wherein said magneto-resistive layer includes a non-magnetic metal layer, a free layer formed on one surface side of said non-magnetic metal layer, a pinned layer formed on an other surface side of said non-magnetic metal layer, and a pinning layer formed on one surface side of said pinned layer opposite to said non-magnetic metal layer.

6. The magnetic head according to claim 1, wherein said first and second magnetic shield layers are made of a same material.

7. The magnetic head according to claim 6, wherein said magneto-resistive layer includes a tunnel barrier layer, a free layer formed on one surface side of said tunnel barrier layer, a pinned layer formed on an other surface side of said tunnel barrier layer, and a pinning layer formed on one surface side of said pinned layer opposite to said tunnel barrier layer.

8. The magnetic head according to claim 6, wherein said magneto-resistive layer includes a non-magnetic metal layer, a free layer formed on one surface side of said non-magnetic metal layer, a pinned layer formed on an other surface side of said non-magnetic metal layer, and a pinning layer formed on one surface side of said pinned layer opposite to said non-magnetic metal layer.

9. The magnetic head according to claim 1, wherein said magneto-resistive layer includes a tunnel barrier layer, a free layer formed on one surface side of said tunnel barrier layer, a pinned layer formed on an other surface side of said tunnel barrier layer, and a pinning layer formed on one surface side of said pinned layer opposite to said tunnel barrier layer.

10. The magnetic head according to claim 1, wherein said magneto-resistive layer includes a non-magnetic metal layer, a free layer formed on one surface side of said non-magnetic metal layer, a pinned layer formed on an other surface side of said non-magnetic metal layer, and a pinning layer formed on one surface side of said pinned layer opposite to said non-magnetic metal layer.

11. A head suspension assembly comprising:
a magnetic head according to claim 1; and
a suspension for supporting said magnetic head mounted near a leading end thereof.

12. A head suspension assembly comprising:
a magnetic head according to claim 2; and
a suspension for supporting said magnetic head mounted near a leading end thereof.

13. A head suspension assembly comprising:
a magnetic head according to claim 6; and
a suspension for supporting said magnetic head mounted near a leading end thereof.

14. A head suspension assembly comprising:
a magnetic head according to claim 9; and
a suspension for supporting said magnetic head mounted near a leading end thereof.

15. A head suspension assembly comprising:
a magnetic head according to claim 10; and
a suspension for supporting said magnetic head mounted near a leading end thereof.

16. A magnetic disk apparatus comprising:
a head suspension assembly according to claim 11;
an arm for supporting said head suspension assembly; and
an actuator for moving said arm to position said magnetic head.

17. A magnetic disk apparatus comprising:
a head suspension assembly according to claim 12;
an arm for supporting said head suspension assembly; and
an actuator for moving said arm to position said magnetic head.

18. A magnetic disk apparatus comprising:
a head suspension assembly according to claim 13;
an arm for supporting said head suspension assembly; and
an actuator for moving said arm to position said magnetic head.

19. A magnetic disk apparatus comprising:
a head suspension assembly according to claim 14;
an arm for supporting said head suspension assembly; and
an actuator for moving said arm to position said magnetic head.

20. A magnetic disk apparatus comprising:
a head suspension assembly according to claim 15;
an arm for supporting said head suspension assembly; and
an actuator for moving said arm to position said magnetic head.

* * * * *